(12) United States Patent
Kepley, Jr.

(10) Patent No.: US 8,267,527 B2
(45) Date of Patent: Sep. 18, 2012

(54) PORTABLE AND TRANSPORTABLE 2-D AND 3-D DISPLAY SYSTEM

(76) Inventor: LeRoy Francis Kepley, Jr., Mineloa, TX (US)

(*) Notice: Subject to any disclaimer, the term of this patent is extended or adjusted under 35 U.S.C. 154(b) by 391 days.

(21) Appl. No.: 12/750,948

(22) Filed: Mar. 31, 2010

(65) Prior Publication Data
US 2011/0242501 A1 Oct. 6, 2011

(51) Int. Cl.
*G03B 21/14* (2006.01)
*G03B 21/26* (2006.01)
*G03B 21/56* (2006.01)
*F16M 11/05* (2006.01)

(52) U.S. Cl. .......................... 353/79; 248/917
(58) Field of Classification Search .................. 353/79; 248/917–924; 359/443
See application file for complete search history.

(56) References Cited

U.S. PATENT DOCUMENTS

| 5,999,232 A | 12/1999 | Kepley, Jr. et al. |
| 6,736,516 B1 | 5/2004 | Kepley, Jr. et al. |
| 7,290,888 B2 | 11/2007 | Kepley, Jr. et al. |

*Primary Examiner* — William C Dowling
(74) *Attorney, Agent, or Firm* — Howison & Arnott, L.L.P.

(57) ABSTRACT

A portable projection system comprises a first and second vertical member including at least one hinged point for folding the first and second vertical member into at least two separate portions. A first and second horizontal member connected with the first and second vertical members includes at least one hinged point for folding the first and second horizontal member into at least two separate portions. At least one base member pivots between a first position parallel to the first or second vertical member and a second position perpendicular to the first or second vertical member. First and second mounting members of a projector mounting assembly include at least one hinged point for folding the first and second mounting members into at least two separate portions. A projector mounting assembly mounting bracket pivotally connects the first and second mounting members with the first horizontal member.

18 Claims, 22 Drawing Sheets

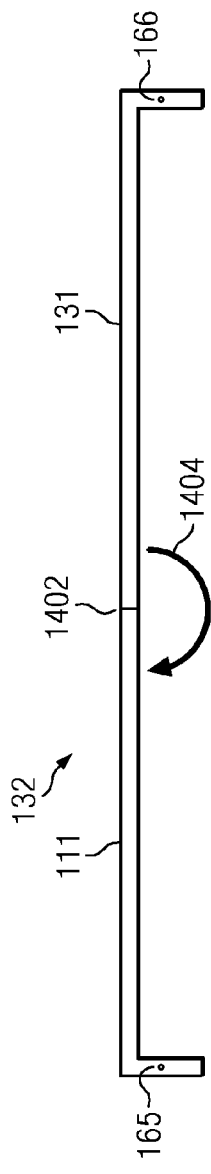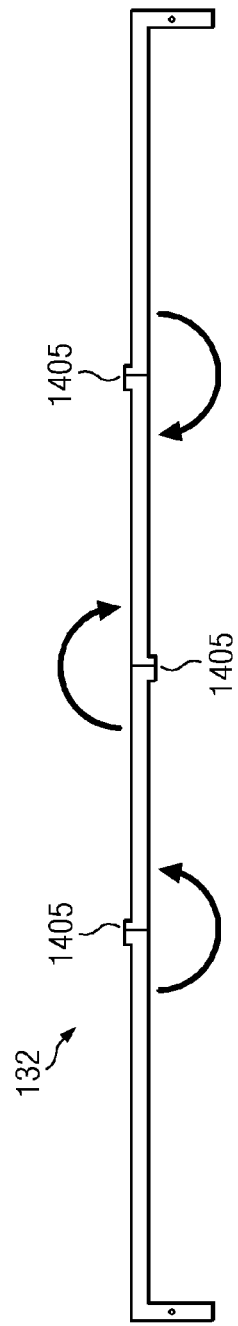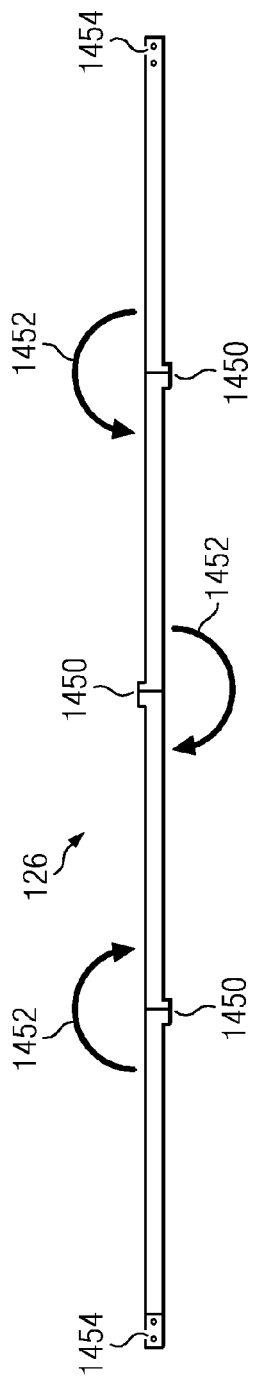

PORTABLE AND TRANSPORTABLE 2-D AND 3-D DISPLAY SYSTEM

TECHNICAL FIELD

The present invention relates to projector systems, and more particularly, to portable and transportable projection systems for supporting a projector and display screen.

BACKGROUND

Audio/visual displays typically utilize some type of forward projection system that utilize a projector that is mounted a predetermined distance from a screen. This screen can either be reflective for viewing from the same side as the projector or the screen can be somewhat less than opaque such that the projector can be mounted on the rear side of the screen. Typically, these projectors are mounted on some type of mobile caddy that is disposed in the room. However, such mounting of the projector utilizes valuable floor space in the viewing room. As such, some of the projectors are ceiling mounted such that they can be mounted on the ceiling away from the seating area or above the seating area. The problem with this type of mounting system is the wiring, the fact that the mounting has to be predefined and the lack of mobility of the configuration. In some applications, there has been provided a combination of structures for mounting the projector wherein the screen is part of the structure. However, these types of structures require some type of support for the projector in front or at the rear, in addition to the mounting structure for the screen. Additionally, there is a need to provide transportability for screen projection system in a carrying case. In uses such as the military, homeland security, corporate functions, construction sites, etc., a projection display system may be needed temporarily in different areas at a particular location (portable) and then must be broken down and moved (transportable) to another location or used for another venue. Thus, there is a need that the display system be easily broken down into a portable configuration while still providing the display capabilities for the projection system.

SUMMARY

The present invention, as disclosed and described herein, comprises a portable projection system including a first vertical member including at least one hinged point for folding the first vertical member into at least two separate portions. A second vertical member includes at least one hinged point for folding the second vertical member into at least two separate portions. The second vertical member is disposed parallel to the first vertical member and has substantially the same length as the first vertical member. A first horizontal member disposed perpendicularly between and pivotally connected with the first and second vertical members includes at least one hinged point for folding the upper horizontal member into at least two separate portions. A second horizontal member is disposed perpendicularly between and pivotally connected with the first and second vertical member including at least one hinged point for folding the second horizontal member into at least two separate portions and located below the first horizontal member to define a viewing area bounded by the first and second vertical members and the first and second horizontal members. A viewing screen is disposed over said viewing area. At least one base member pivotally connects to a base end of each of the first and second vertical members. The at least one base member pivots between a first position parallel to the first or second vertical member and a second position perpendicular to the first or second vertical member. A projector mounting assembly comprises first and second mounting members. The first and second mounting members are pivotally connected to each other at first ends of the first and second mounting members. The first and second mounting members include at least one hinged point for folding the first and second mounting members into at least two separate portions. The first and second mounting members extend over the first horizontal member such that the first ends of the first and second mounting members are disposed forward of the viewing area a first distance and a second end of the first and second mounting members extending rearward of the viewing area a second distance. A projector mounting assembly mounting bracket associated with each of the first and second mounting members pivotally connects the first and second mounting members with the first horizontal member. A plurality of cables connects the second end of one of the first and second mounting members with a base member to maintain the first and second mounting members substantially perpendicular to the viewing area.

BRIEF DESCRIPTION OF THE DRAWINGS

For a more complete understanding, reference is now made to the following description taken in conjunction with the accompanying Drawings in which:

FIG. 14a illustrates a front view of version one of the removable middle crossbar of the projector mounting system;

FIG. 14b illustrates a front view of a second version of the removable middle crossbar member;

FIG. 14c illustrates a bottom view of the base crossbar member;

DETAILED DESCRIPTION

Figure 1:
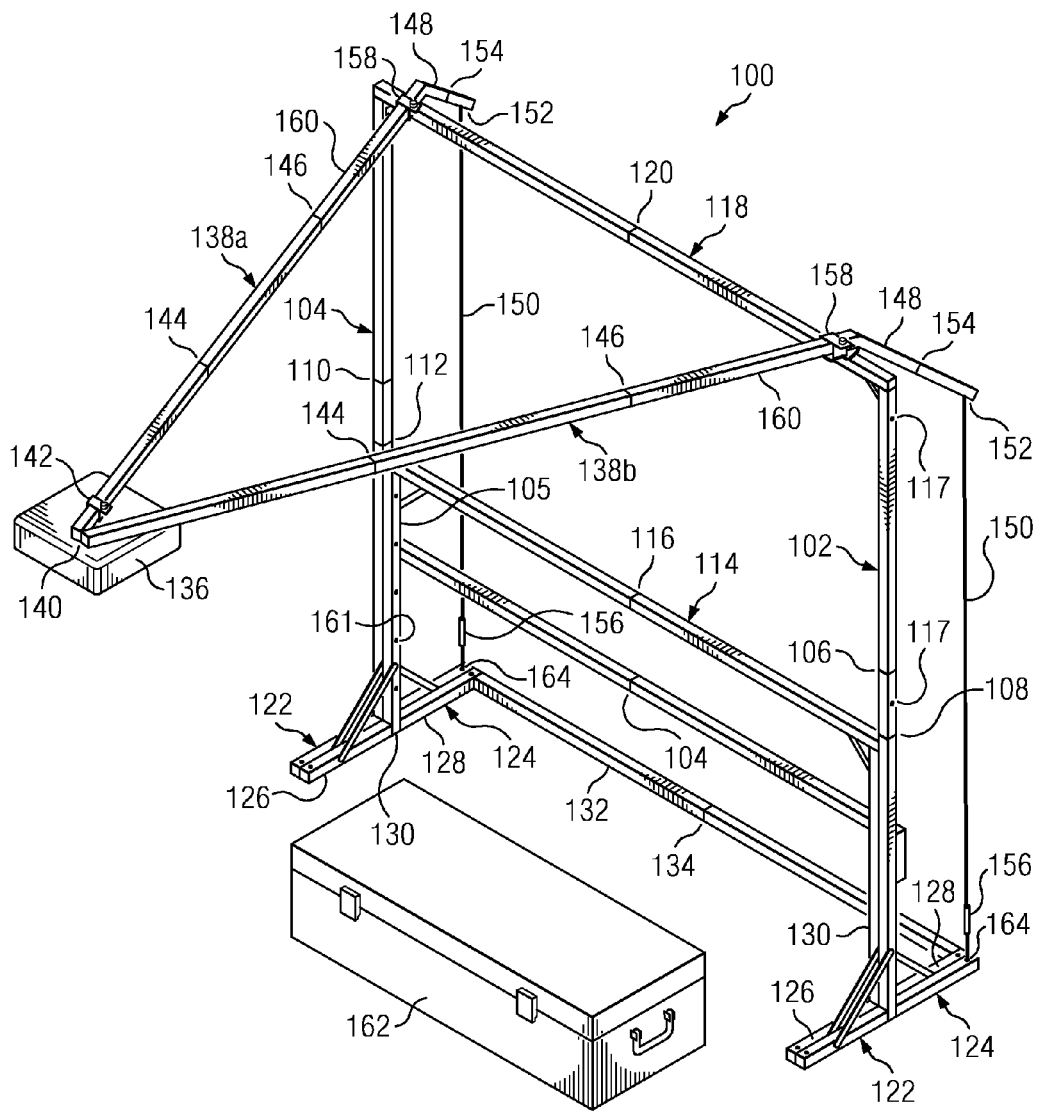
FIG. 1 illustrates a perspective view of the projector mounting system.

Referring now to the drawings, wherein like reference numbers are used herein to designate like elements throughout, the various views and embodiments of a portable and transportable 2-D and 3-D display system are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1, there is illustrated a perspective view of the projector mounting system of the present disclosure. A screen frame 100 includes a first multi-piece vertical member 102 and a second multi-piece vertical member 104. The first multi-piece vertical member 102 is collapsible into a portable configuration along hinged points 106 and 108 such that the vertical member 102 may be collapsed into a first, second and third portions. Similarly, the second multi-piece vertical member 104 is collapsible along hinged points 110 and 112 to form first, second and third portions. A middle crossbar member 114 connects between the first vertical member 102 and the second vertical member 104. The two piece middle crossbar member 114 is also collapsible at hinged points 116 enabling the middle crossbar member 114 to break into two portions. A top crossbar member 118 interconnects the top of the first vertical member 102 with the top of the second vertical member 104. The top crossbar member 118 is also hinged to collapse along a line 120 in a similar manner to the middle crossbar member 114. Each of the middle crossbar member 114 and top crossbar member 118 are pivotally connected to the first and second vertical members 102 and 104 to allow collapse of the screen frame 100.

The first vertical member 102, second vertical member 104, middle crossbar member 114 and top crossbar member 118 define a rectangular area therebetween on which a viewing screen may be connected. The screen surface can be approximately 60 to 100 inches wide and approximately 45 to 60 inches high. In a preferred embodiment, the screen is connected via snap connectors to the frame defined by the first and second vertical members 102, 104 and the middle and top crossbar members 114, 118. However, other types of connecting apparatus could also be utilized.

The first and second vertical members 102, 104 are maintained in an upright position using a first base foot members 122 and a second base foot members 124. The first base foot members 122 and second base foot members 124 fold parallel to each of the first vertical member 102 and second vertical member 104 in a portable configuration. The first base foot extenders 126 and second base foot extenders 128 fold parallel to the first height extenders 130 in a portable configuration. The base foot extenders 128 and base foot members 124 may be interconnected via a removable crossbar base member 132. The crossbar base member 132 connects between the base foot extenders 128 and base foot members 124 to provide additional stability to the screen frame 100. The crossbar base member 132 is also collapsible to half its size at a hinged connection 134. The crossbar base member 132 can be attached to the ground or weights may be put on the crossbar base member 132 to make the screen structure stable. When the screen is raised using first and second height extenders 130, the crossbar base member 132 connects between the base foot members 128.

A projector 136 is provided as an image source. The projector 136 can be an LCD or DLP projector or may utilize any other type of image source generation projector that can project an image from the front thereof a distance therefrom to a screen mounted on the screen frame structure described hereinabove. Any type of projector 136 can be utilized provided that it has reasonably lightweight characteristics and in one embodiment may be a distance of one screen width or less from the screen.

A projector mounting assembly includes a first projector support arm 138a and a second projector support arm 138b. The first and second projector support arms 138a and 138b are connected together at a pivoting point 140 at one end of the first and second projector support arms 138. The projector 136 is connected to the support arm 138a at projector mounting bracket 142 as will be more fully described hereinbelow. Each of the projector support arms 138 extend outward from the pivoting point 140 to mount at opposing ends of the top crossbar member 118. The projector support arms 138 each include at least a pair of hinged breakpoints 144 and 146 that enables the projector support arms 138 to fold down into a shorter, more portable configuration. Each projector support arm 138 additionally includes a mounting portion 148 connected to an end of the projector support arms 138 opposite the pivoting point 140.

An adjustable cable 150 may be connected to an end 152 of each mounting portion 148 enabling connection to the crossbar base member 132. The mounting portion 148 additionally is collapsible at a hinged point 154 that enables the projector mounting assembly to be folded into a smaller configuration for transport. A pair of adjustable cables 150 extends from the mounting portion 148 to the base foot members 124 as discussed previously. The cables 150 are adjustable using turnbuckle 156 to raise and lower the projector 136 for proper alignment. The pair of cables 150 exert a downward force on the projector support arms 138 to enable the projector support arms 138 to support the weight of the projector 136 connected at the projector mounting bracket 142 to the projector support arms 138.

The projector support arms 138 are fully adjustable left or right and in and out on the hinge bracket assembly 158 to align the projector 136. The projector mounting bracket 142 is fully adjustable to align the projector. The projector support arms 138 may be reverse mounted at hinge brackets 158 and cables 150 attach to the base foot members 122 on the opposite side of screen 100. The projector support arms 138 are reinforced using aluminum strips 160 welded to both sides of the projector support arms 138 as will be more fully described hereinbelow. This strengthens and stabilizes the projector support arms 138 and enables the use of heavier projectors 136 and longer projector support arms 138 for wider screens.

The components comprising the screen frame 100 and the projector support assembly, in a preferred embodiment, comprise extruded aluminum or black anodized aluminum stock that is rectangular. This enables the provision of a fairly lightweight structure that may be collapsed along the various hinged break points described hereinabove to enable placement of the structure within an associated carrying case 162.

Using the above-described projection display system, the cables 150 may be disconnected at points 164 and the projector 136 and projector support arms 138 rotate about hinges 158 parallel to the screen surface. This ability allows operators to move the projection display system to different locations in a complex. The projector 136 and associated screen may be easily transported from site to site in a portable mode by breaking down the screen 100 and storing it in an associated carrying case 162. The collapsible nature of the screen structure and the various brackets described with respect thereto enable the portable transportable screen structure to be easily implemented in a field environment.

While the above description has recited a particular number of hinged points within each of the members making up the projector display screen 100, it should be realized that additional or fewer hinged points could be inserted within the members such that they break down into even a smaller configuration than that illustrated in FIG. 1. Particular examples of the screen 100 including further hinged points within the structure are illustrated in FIGS. 2-10.

Figure 2:
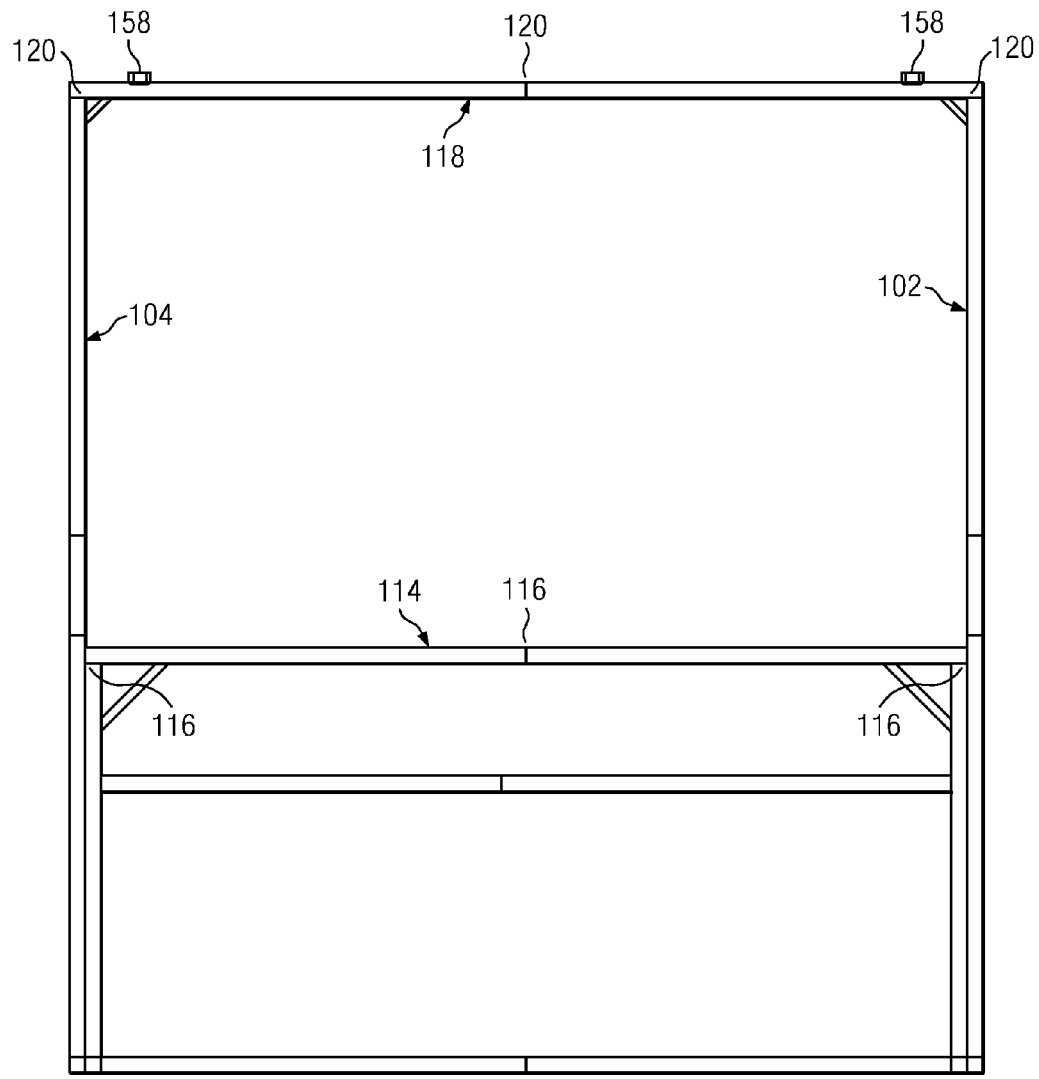
FIG. 2 illustrates a front view of the projector mounting system.
Figure 3:
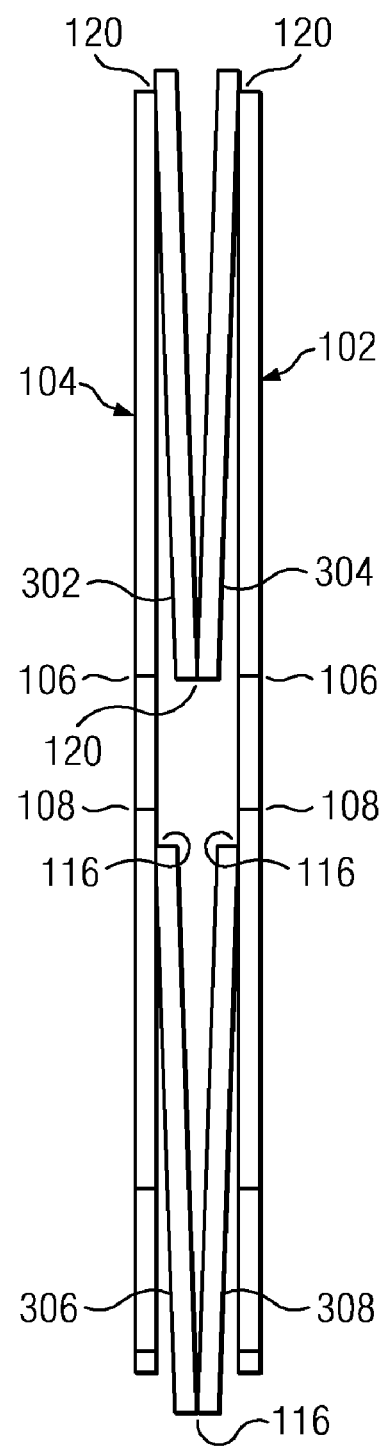
FIG. 3 illustrates a front view of version one of the partially collapsed projector mounting system.
Figure 4:
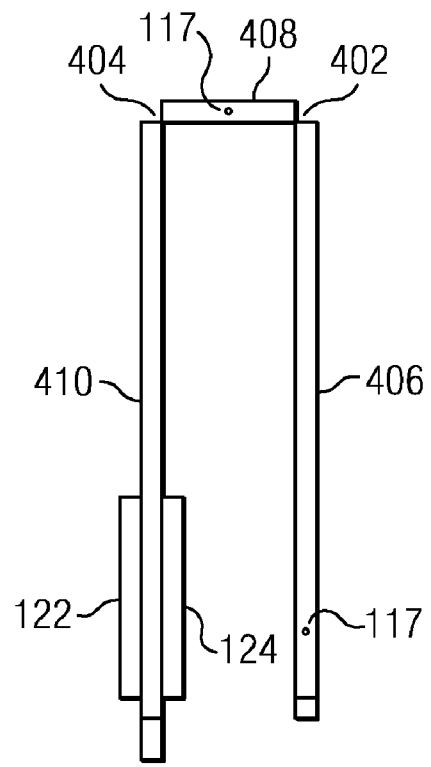
FIG. 4 illustrates a side view of version one of the collapsed projector mounting system.

Referring now to FIG. 2, there is illustrated a front view of the projection mounting system of the present disclosure. By referring to FIG. 2, it can be seen how the middle crossbar member 114 and the top crossbar member 118 collapse downward to enable the transportation of the system. In the collapse downward version illustrated in FIG. 3, the top crossbar member 118 unlocks and pivots at points 120 such that each half of the top crossbar member 118 will fold down with each half 302 and 304 parallel to each other and parallel to vertical members 102 and 104. Likewise, middle crossbar member 114 will hinge at point 116 such that each half 306 and 308 of the middle crossbar member 114 will fold down parallel to first vertical member 102 and the second vertical member 104. As the top crossbar member 118 and middle crossbar member 114 fold down, the first vertical member 102 and second vertical member 104 will collapse toward each other. The first vertical member 102 and second vertical member 104 may then be folded at hinged break points 402 and 404 to form a U shape as shown in FIG. 4 into portions 406, 408 and 410.

Figure 5:
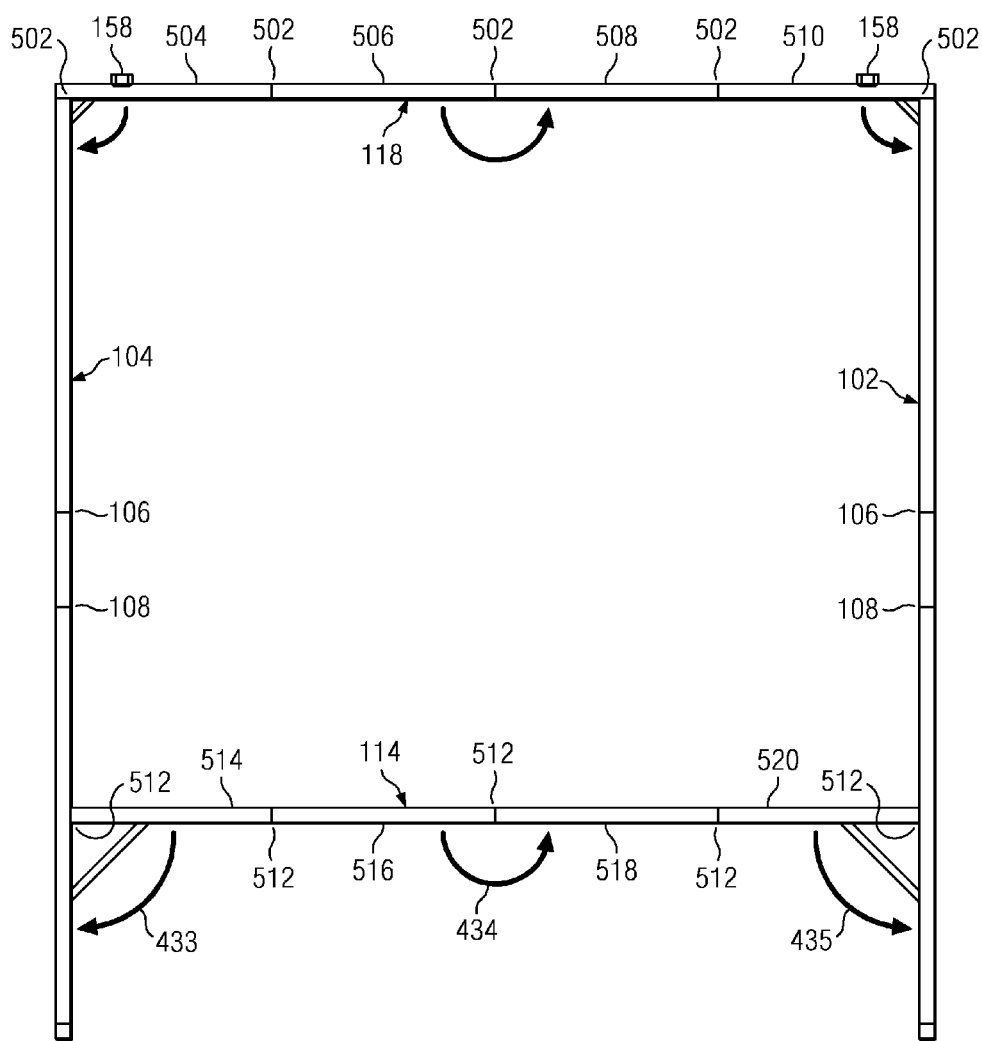
FIG. 5 illustrates a front view of version three of the projector mounting system.
Figure 6:
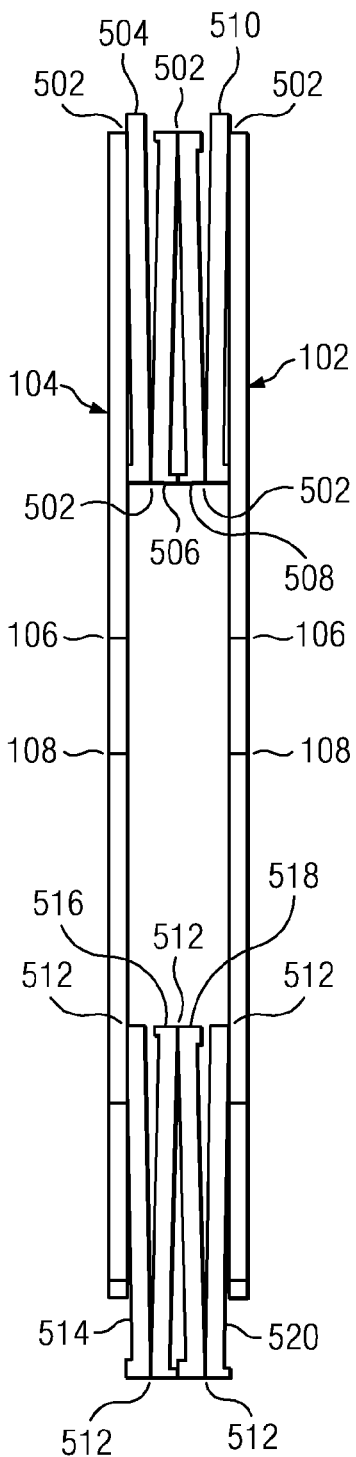
FIG. 6 illustrates a front view of version three of the partially collapsed projector mounting system.
Figure 7:
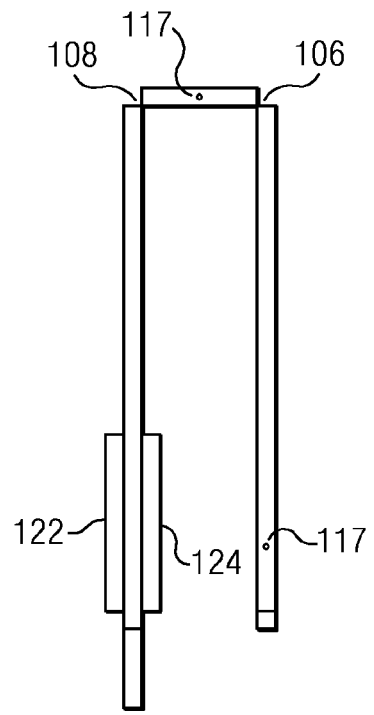
FIG. 7 illustrates a side view of version three of the collapsed projector mounting system.
Figure 8:
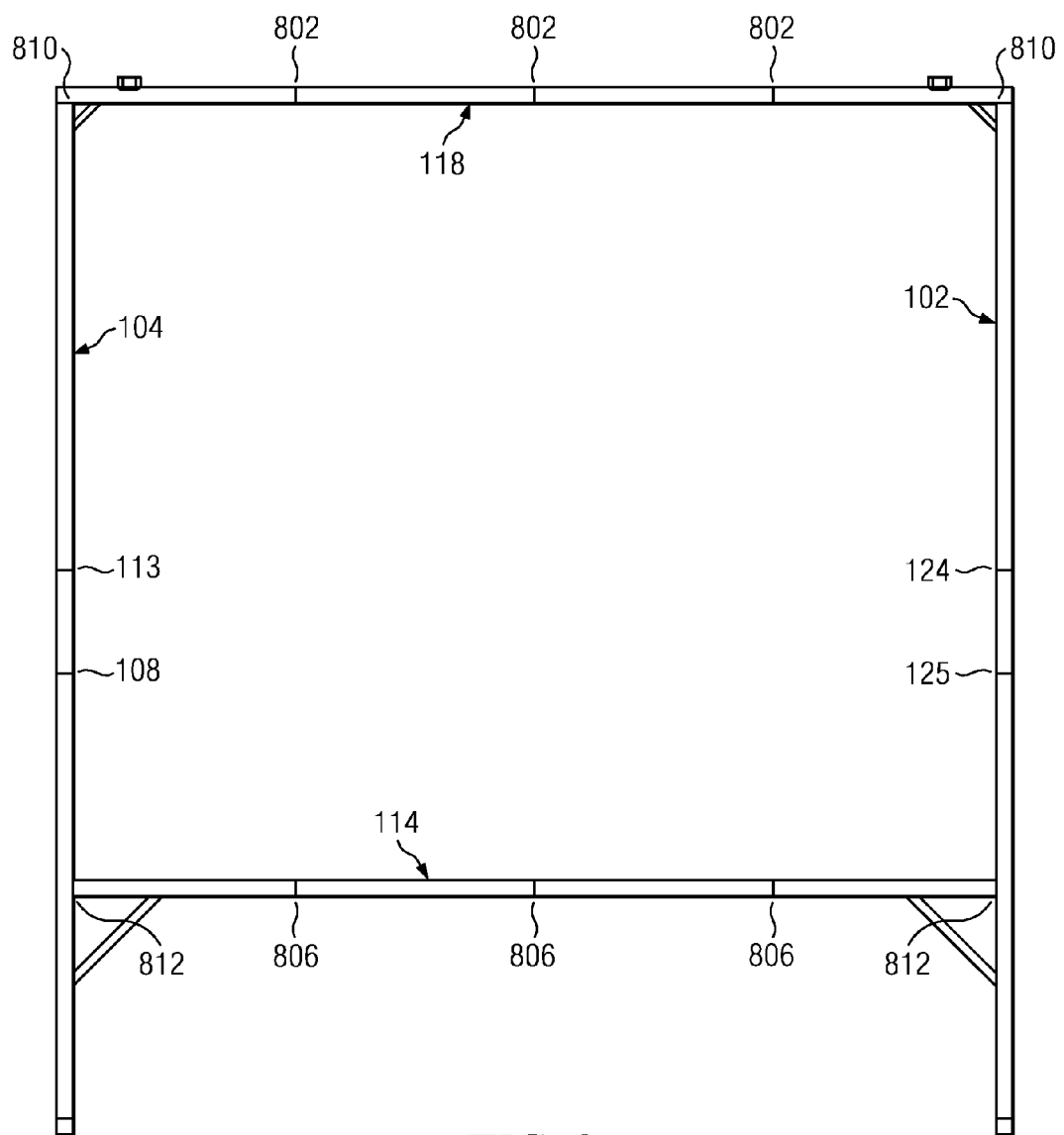
FIG. 8 illustrates a front view of version two of the projector mounting system.
Figure 9:
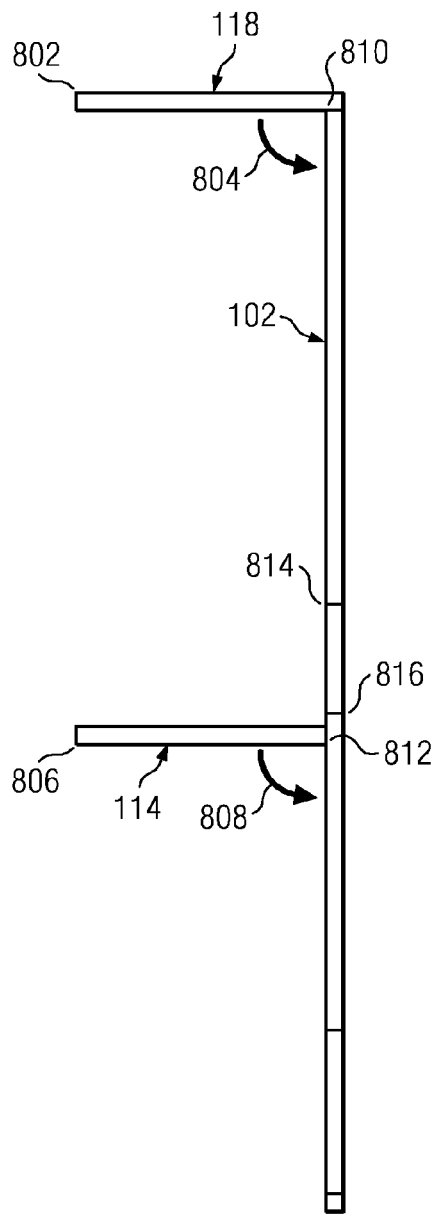
FIG. 9 illustrates a side view of version two of the partially collapsed projector mounting system.
Figure 10A:
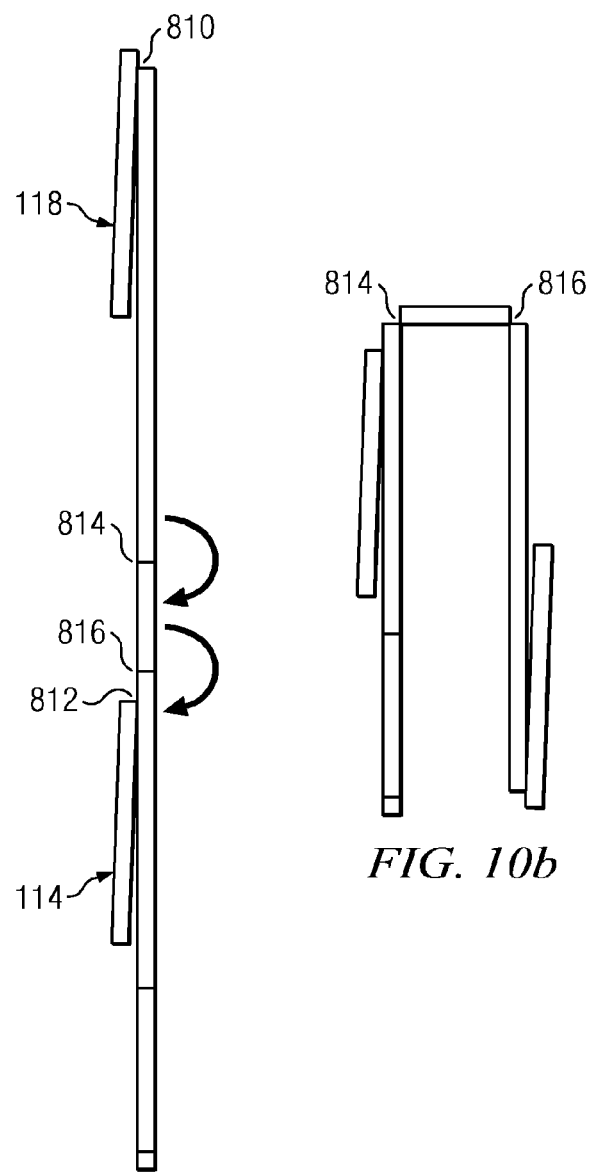
FIG. 10a illustrates a side view of version two of the partially collapsed projector mounting system.
Figure 10B:
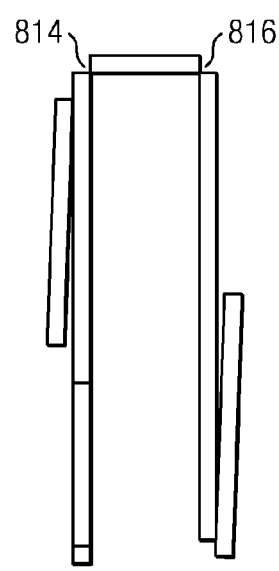
FIG. 10b illustrates a side view of version two of the collapsed projector mounting system.

Referring now to FIGS. 5-7, there is illustrated an alternative collapsible configuration having more hinged points. In this collapsible version, the top crossbar member 118 unlocks and pivots at points 502 such that top crossbar member sections 504, 506, 508 and 510 fold down parallel to each other and first vertical member 102 and second vertical member 104. Likewise, middle crossbar member 114 will unlock and pivot at points 512 in the same manner as four piece top crossbar member such that four middle crossbar member sections 514, 516, 518 and 520 are parallel to vertical members 102 and 104. The advantage of the four piece top and middle crossbar version is the ability to produce large screens and still maintain transportability in the same screen case 120.

FIGS. 8-10b illustrate yet another embodiment wherein the screen may collapse backwards. In the collapse backward version, the top crossbar member 118 unlocks and pivots at points 802 such that top crossbar member 118 will fold in fourths with each fourth parallel to the other. Folded top crossbar member 118 will then fold down parallel to first vertical member 102 along line 804 at hinged point 810. Likewise, middle crossbar member 114 unlocks and pivots at point 806s such that middle crossbar member 114 will fold in fourths with each fourth parallel to the other. Middle crossbar member 114 will then fold down parallel to first vertical member 102 along line 808. After the top crossbar member 118 and middle crossbar member 114 unlock and fold down at hinged points 810 and 812, the first vertical member 102 and second vertical member 104 will collapse into a U shape at hinged points 814 and 816.

Figure 11:
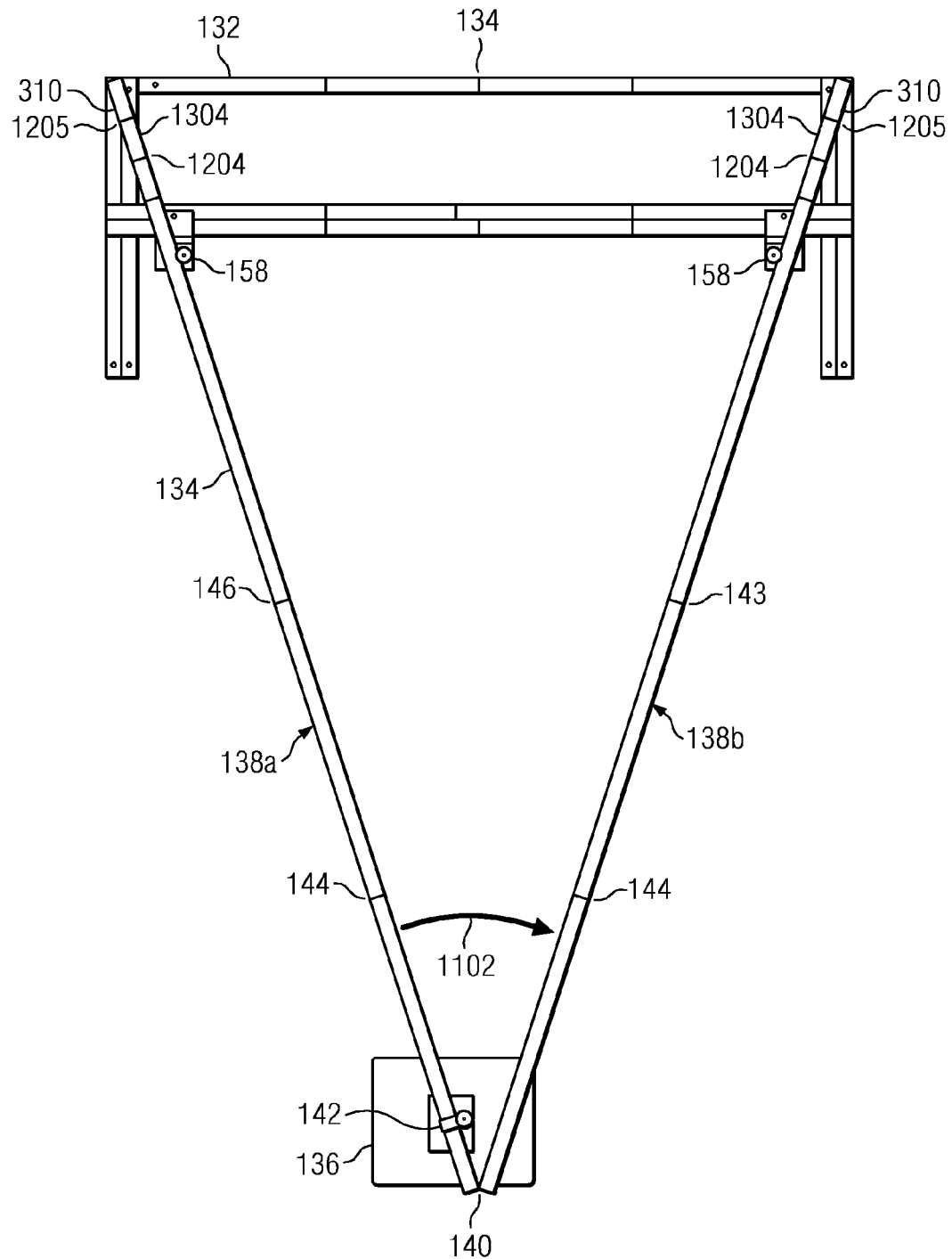
FIG. 11 illustrates a top view of the projector mounting system.

Referring now to FIG. 11, there is illustrated a top view of the projector mounting assembly. As can be seen from the top view, the first support arm 138a and the second support arm 138b are supporting the projector 136 at projector mounting bracket 142. When collapsed for transport, the projector support arms 138a and 138b will be disconnected from the screen frame 100 and unlocked and pivoted toward each other as shown generally by line 1102.

Figure 12:
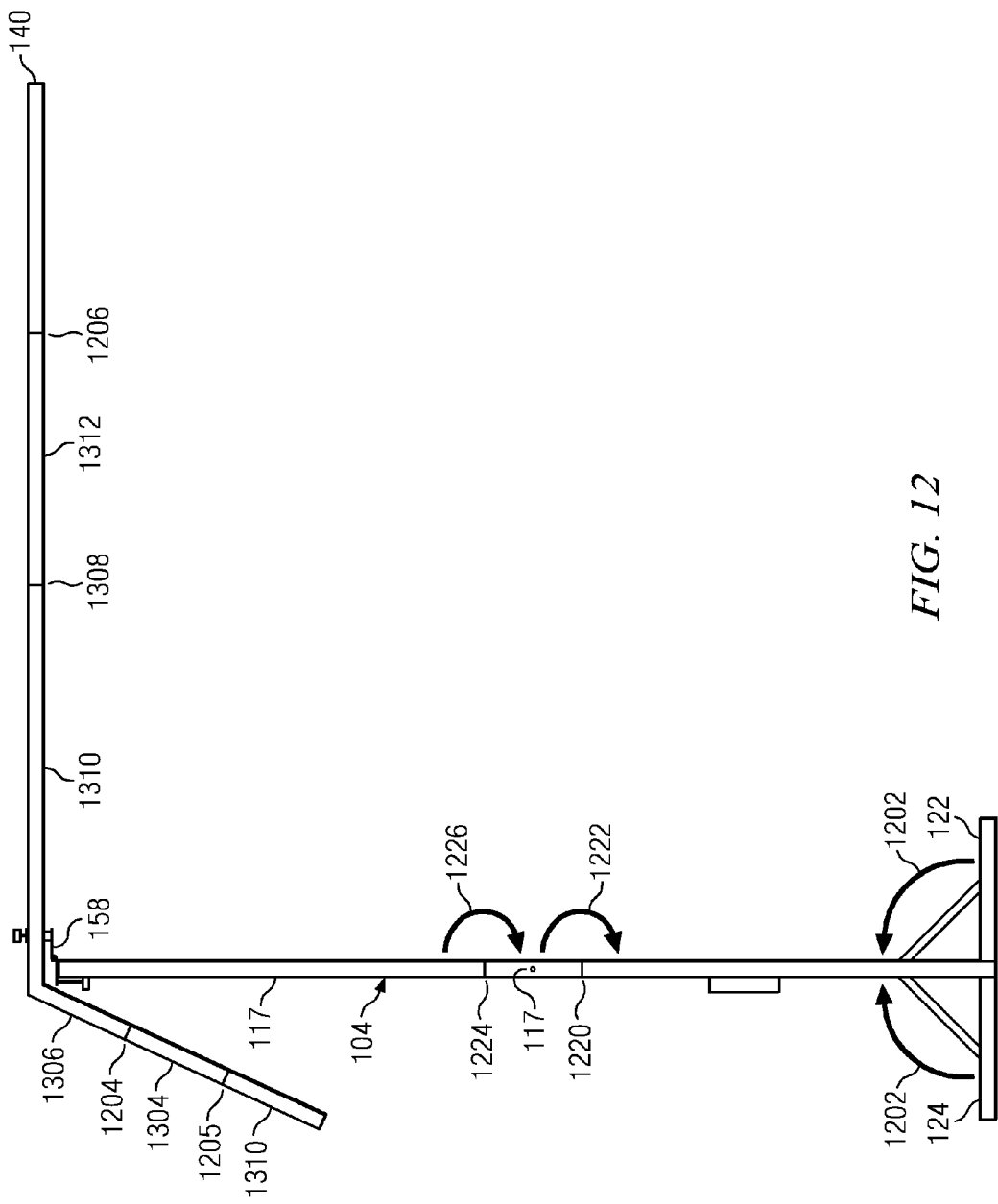
FIG. 12 illustrates a side view of the projector mounting system.
Figure 13A:
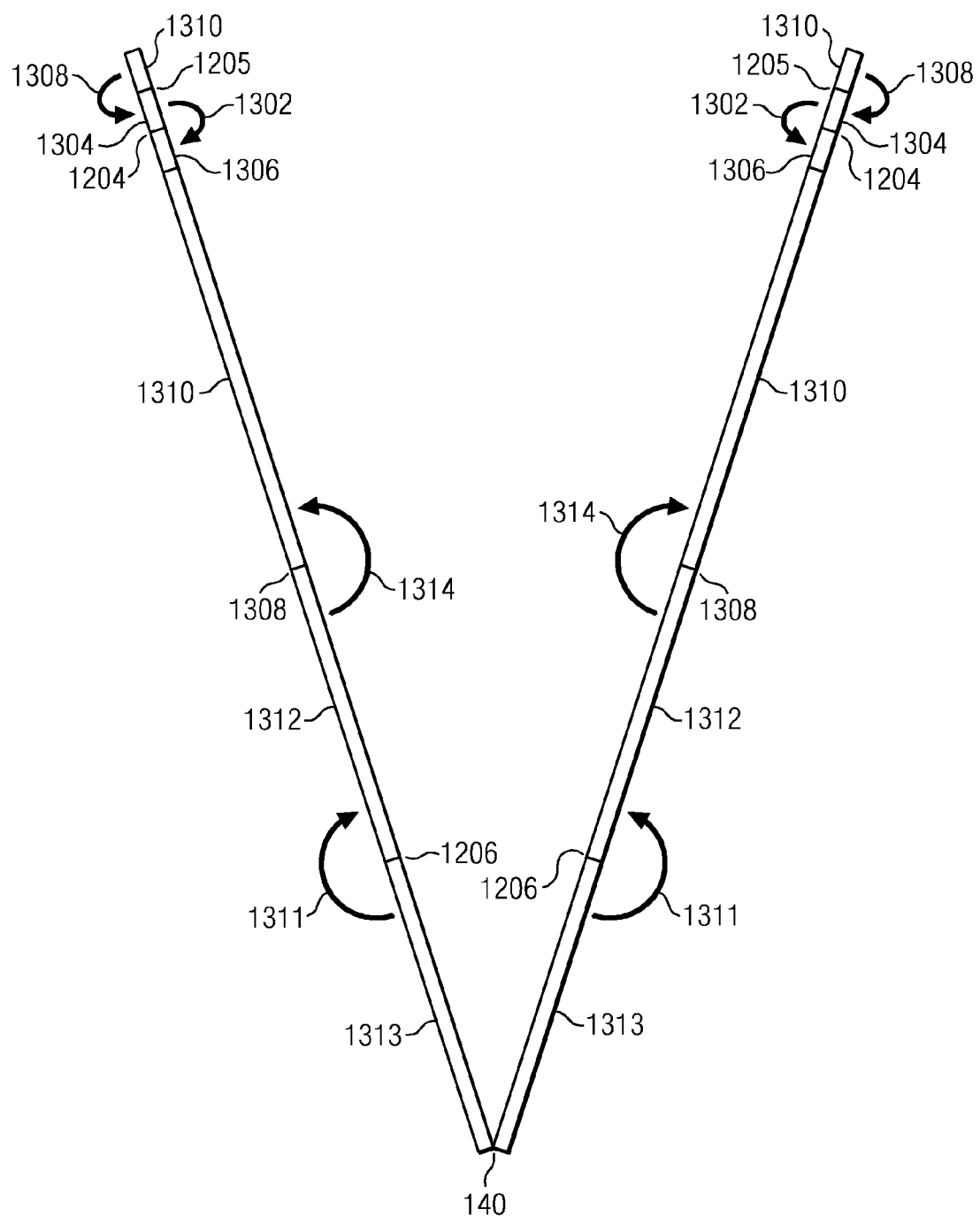
FIG. 13a illustrates a top view of the projector support mounting arm including support plates.
Figure 13B:
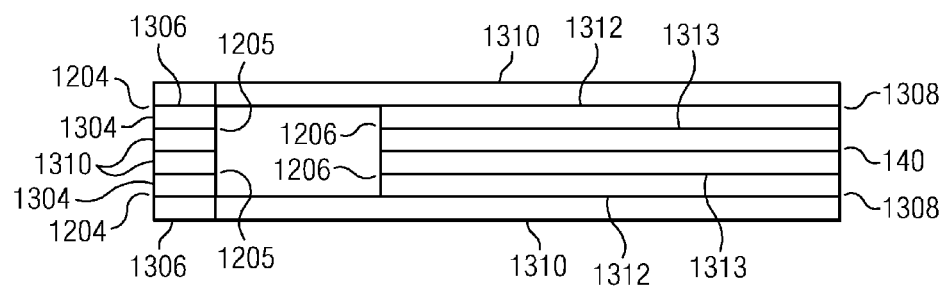
FIG. 13b illustrates the projector support mounting arm assembly folded into a folded configuration.

Referring now to FIGS. 12-13b, there is illustrated a side and top view of the screen frame 100 which more fully illustrates the collapsible nature of various components. The base foot members 122 and 124 may be folded to rest flush against the side of the vertical support member 104 as shown generally by lines 1202. Also illustrated is a collapsible nature of the projector support arm 138. The mounting portion 148 folds along hinged points 1204 and 1205 outward and upward, along arrow 1302 such that portion 1304 folds along the lateral side of portion 1306. The mounting portion 148 then folds at point 1205 along arrow 1308 such that portion 1310 folds parallel to portion 1304. Similarly, the remainder of the projector support arm 138 folds first at point 1206 as indicated by arrow 1311 to place portion 1313 parallel to portion 1312 and at point 1308 projector support arm portion 1312 folds inward and against projector support arm portion 1310, as shown by arrow 1314. This folds the projector support arms into the form shown in FIG. 13b.

Referring now to FIG. 14a, there is illustrated a front view of the removable middle crossbar member 132. The removable middle crossbar member 132 hinges along a pivot point 1402 as indicated generally by arrow 1404. In the embodiment of FIG. 14b, the middle crossbar member 132 hinges at points 1405 to collapse the bar into four portions.

Referring now to FIG. 14c, there is illustrated the base crossbar member 126 that may be interconnected between the base foot members 122 and 124. The base crossbar member 126 hinges at points 1450 that enables the base crossbar member 126 to be folded in on itself along arrows 1452. The base crossbar member 126 additionally includes holes 1454 enabling the base crossbar member 126 to be attached to the base foot members 122 and 124 or the base members of the height extenders as will be more fully described hereinbelow.

Figure 15:
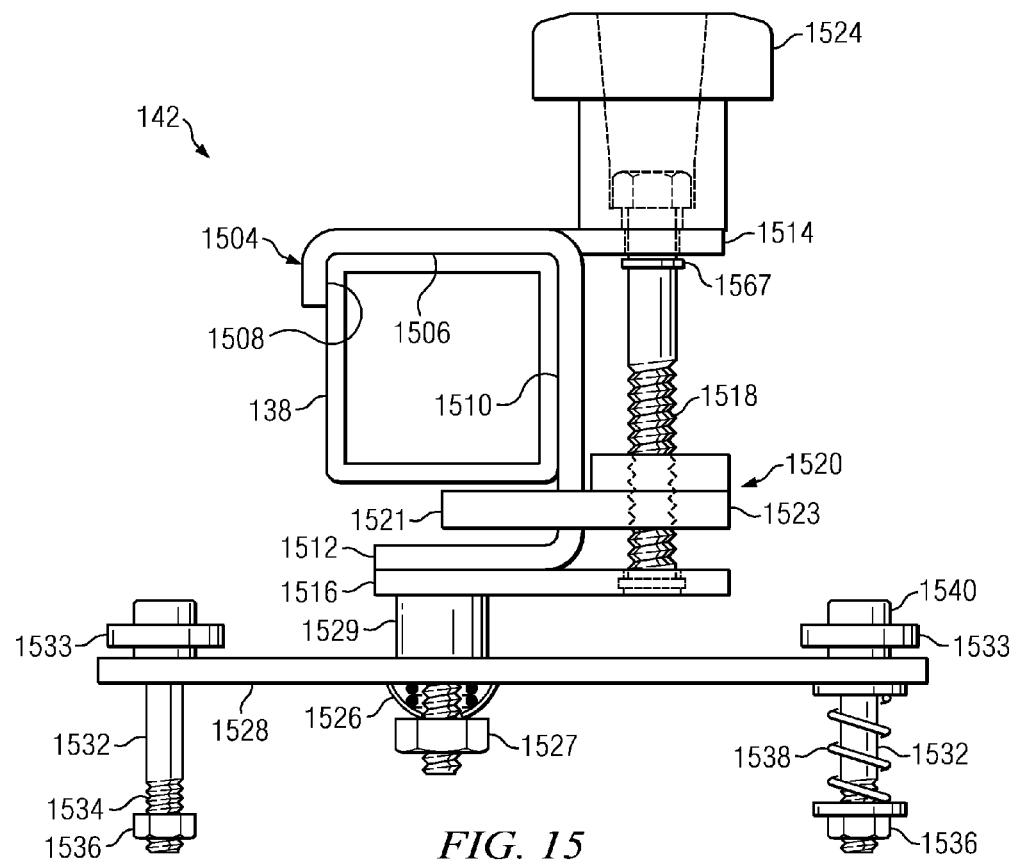
FIG. 15 illustrates a side view of the projector mounting bracket.
Figure 16:
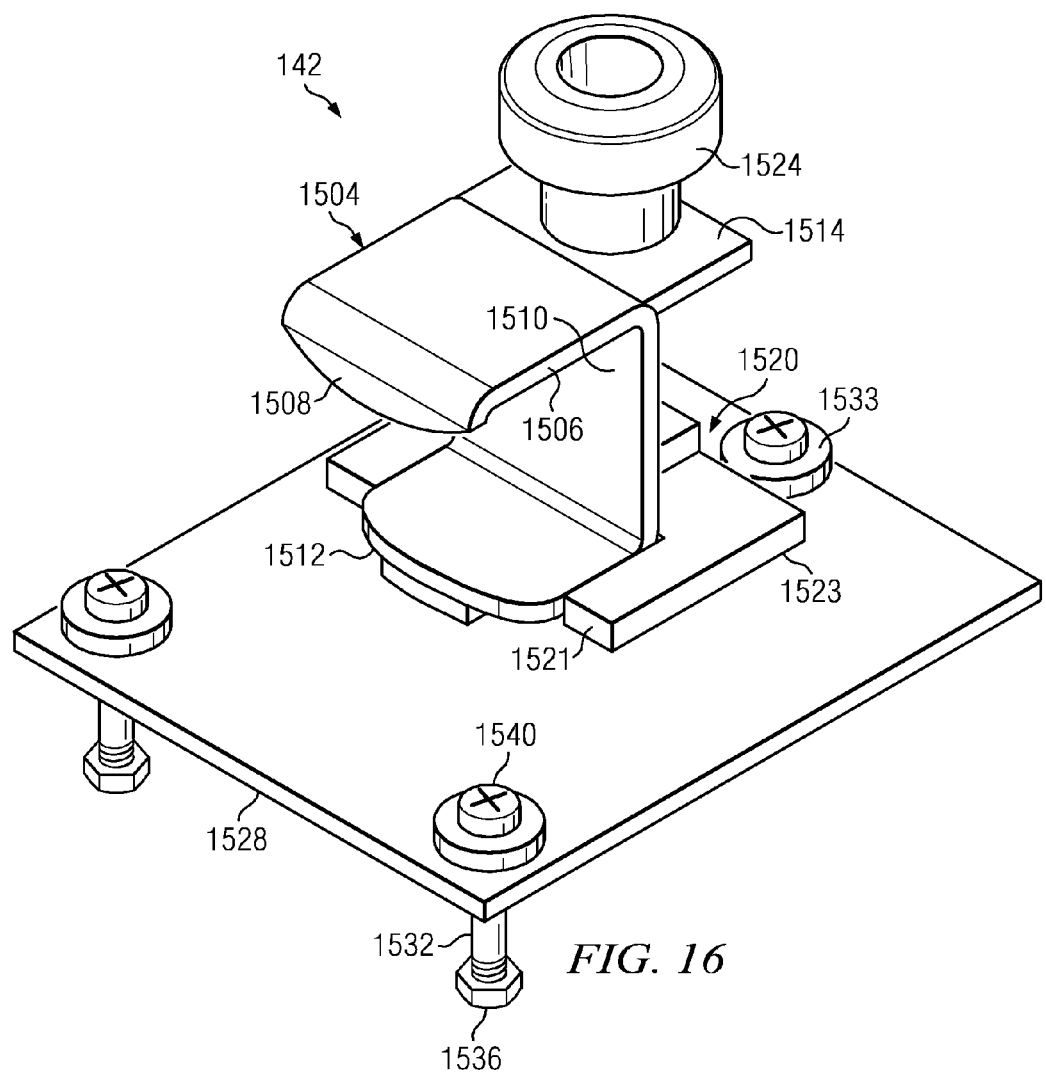
FIG. 16 illustrates a perspective view of the projector mounting bracket.

Referring now to FIGS. 15-16, there are illustrated various views of the projector mounting bracket 142. FIG. 15 illustrates a side view of the projector mounting bracket 142 while FIG. 16 is a perspective view of the projector mounting bracket 142. The projector mounting bracket 142 includes a C-shaped mounting bracket 1504 that is used for attaching the projector mounting bracket 142 to the top of the projector support arm 138. The C-shaped mounting bracket 1504 includes a top plate 1506 that is wide enough to fit across the top surface of the projector support arm 138. A retaining ledge 1508 extends perpendicularly from the top plate 1504 a small distance down a lateral surface of the projector support arm 138. A side plate 1510 extends perpendicularly from the other edge of the top plate 1504 down to the bottom plate 1512. The height of the side plate 1510 is such that an opening is defined between the top surface of the bottom plate 1512 and the bottom edge of the retaining ledge 1508 to enable the projector support arm to be inserted within the interior of the C-shaped mounting bracket 1504 and rest the top plate 1506 on the top surface of the projector support arm 138.

Extending from the top surface of the mounting clamp 1504 is an upper retaining plate 1514. Connected to the bottom surface of the lower plate 1512 of the mounting bracket 1504 is a lower retaining plate 1516. The upper retaining plate 1514 defines a hole therein through which a threaded bolt 1518 is inserted such that the bolt 1518 is a captive bolt within the projector mounting bracket 1512. The bottom of the threaded bolt 1518 is connected to the lower retaining plate 1516 in a rotatable manner.

A clamping plate 1520 comprises a C-shaped plate having a pair of arms 1521 extending outwardly from a base portion 1523 on each side of the mounting bracket 1504. The base portion 1523 of the clamping plate 1520 defines a threaded hole therein through which the bolt 1518 threadedly engages the clamping plate 1520. A knob 1524 is attached to the top of the bolt 1518 to enable the bolt to be easily turned. When the bolt 1518 is turned in a counter clockwise direction, the clamping plate 1520 will lower and approach the lower plate 1512 of the C-shaped mounting bracket 1504. This could be used in a situation when the projector mounting bracket 142 needs to be loosened to remove or adjust the C-shaped mounting bracket 1504 on the projector support arm 138. When the clamping plate 1520 is lowered, the projector mounting support arm 138 may be easily moved from the interior of the mounting bracket 1504.

When the mounting bracket 1504 is to be secured to the projector support arm 138, the bolt 1518 is turned in the clockwise direction which causes the level of clamping plate 1520 to raise and clamp the projector support arm 138 between the arms 1521 of the clamping plate 1520 and the top plate 1506 of the mounting bracket 1504. Since the bolt 1518 is a captive bolt and secured to the upper external plate 1514 by way of a retaining washer 1567, the user does not have to worry about the bolt being loosened too far and lost from the projector mounting bracket 1502.

A post 1526 extends from the bottom of the lower retaining plate 1516. The post 1526 extends through a projector plate 1528. The projector plate 1528 is secured to the post 1526 by a nut 1527 that screws on to the threaded end of the post 1526 extending through a hole in the projector plate 1528. Located between projector plate 1528 and nut 1527 are a spring washer and two rubber o-rings which act as a clutch. This enables easy adjustment of the projector 136. The bolt 1526 secures the projector plate 1528 to the C-shaped mounting bracket 1504 and are separated by a spacer 1529 and enables the projector plate 1528 to be rotated about the post 1526 to enable adjustment of the direction of projection of an image from the projector.

The projector plate 1528 includes three securing bolts 1532, which may threadedly engage associated holes within the projector 136. The threaded bolt 1532 extends through the projector plate 1528 and may be rotated freely therein. A threaded portion 1534 threadedly engages the associated hole within the projector 136 and further passes through a mounting nut 1536. A spring 1538 maintains the tension on the rear mounting bolt between the projector plate 1528 and the mounting nut 1536. By turning the bolt head grip 1540, the bolt 1532 may be rotated to engage or disengage from the associated threaded hole within the projector 136. In a preferred configuration, the mounting bolts 1532 would be spaced in a triangular orientation on the mounting plate 1528 with two mounting bolts 1532 mounted on each corner of the front edge of the mounting plate 1528 and the third mounting bolt 1532 mounted in the center of the opposing side. This configuration permits adjustment of projector yaw, pitch and roll by turning bolt head grip 1533.

Figure 17:
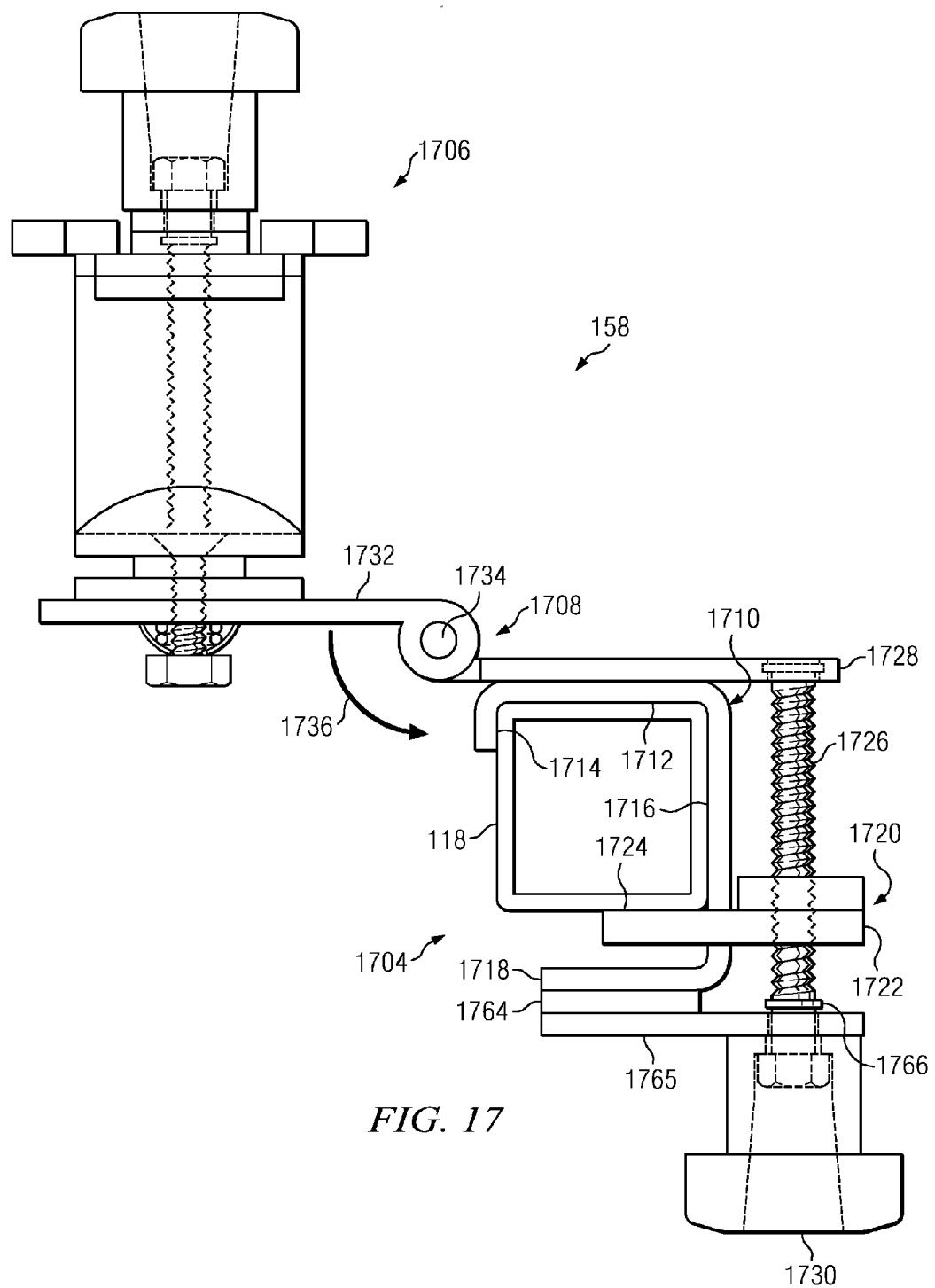
FIG. 17 illustrates a side view of the projector support arm mounting bracket.
Figure 18:
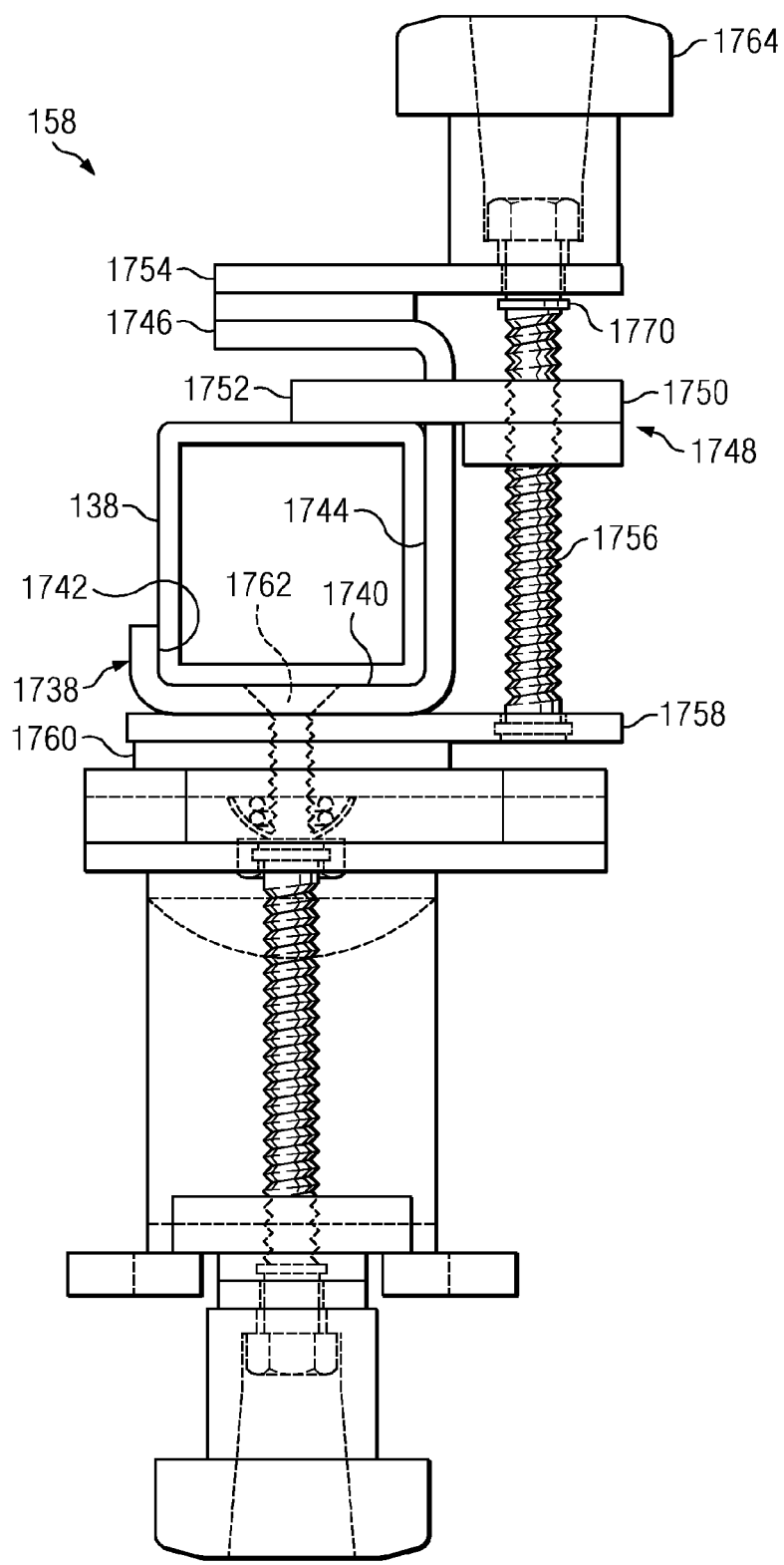
FIG. 18 illustrates a front view of the projector support arm mounting bracket.
Figure 19:
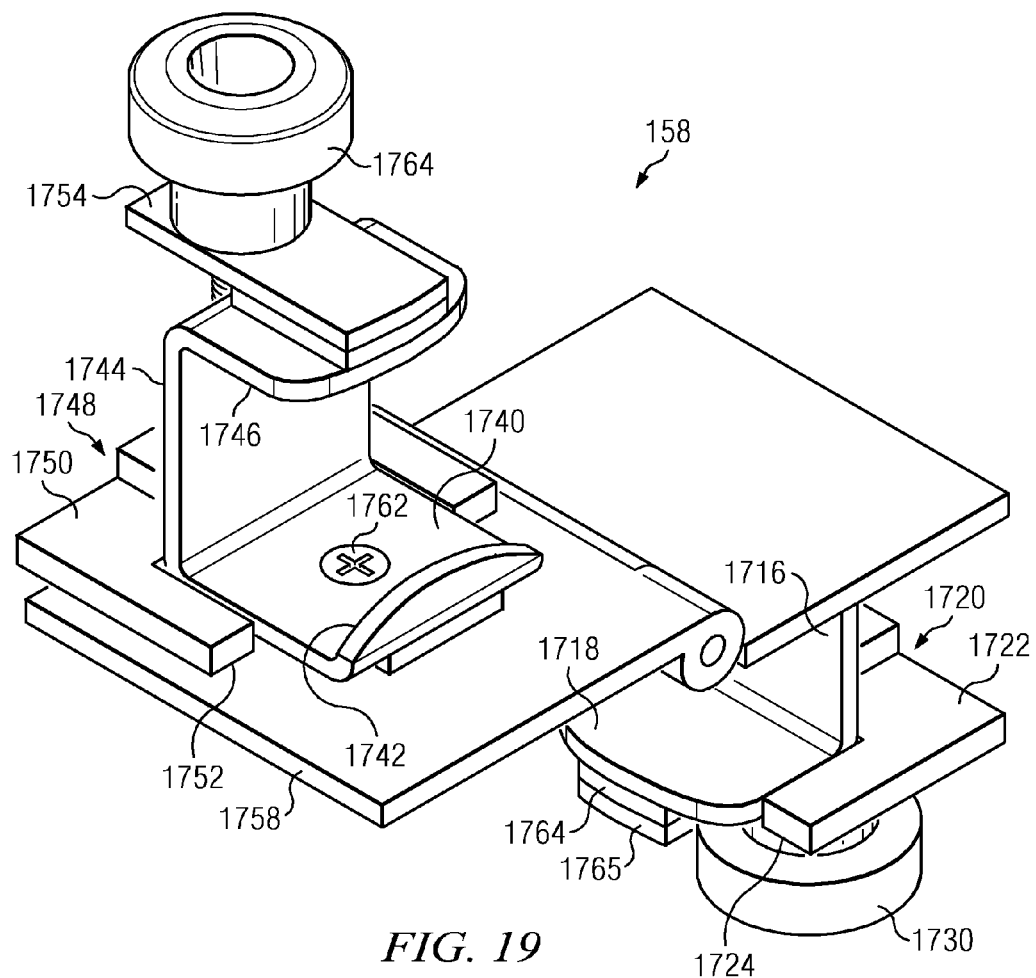
FIG. 19 illustrates a perspective view of the projector support arm mounting bracket.

Referring now to FIGS. 17-19, there are illustrated the screen hinge bracket 158. The screen hinge bracket 158 includes a crossbar mounting assembly 1704 for connecting the screen hinge bracket 158 to the top crossbar member 118 and a projector support arm mounting assembly 1706 for connecting to projector support arm 138. The projector support arm mounting assembly 1706 and crossbar mounting assembly 1704 are interconnected via a hinge 1708. The screen hinge bracket 158 is used for connecting the projector support arms 138 to the top crossbar member 118. Due to the use of the hinge 1708, this provides for a pivotal connection between the projector support arms 138 and the top crossbar member 118. The pivotal connection allows the projector support arms 138 to pivot between a position above the screen frame 100 to compensate for projector offset or parallel to the screen frame.

The crossbar mounting assembly 1704 includes a C-shaped first mounting bracket 1710 having a top plate 1712 having a width enabling the first mounting bracket 1710 to be placed on top of the top crossbar member 118. A retaining edge 1714 extends perpendicularly from the top plate 1712 to provide an edge for retaining the top crossbar member 118 between the retaining edge 1714 and a side plate 1716. The side plate 1716 is long enough to provide a distance between the bottom edge 1714 and a bottom plate 1718 such that the top crossbar member 118 may be inserted within the mounting bracket 1710. A clamping plate 1720 includes a base portion 1722 defining a threaded hole therein through which a retaining bolt 1726 extends. Extending from the base portion 1722 are arms 1724 on each side of the mounting bracket 1710. The arms 1724 are used for engaging the base of the top crossbar member 118 and clamping the top crossbar member 118 within the mounting bracket 1710. The retaining bolt 1726 extends through a lower retaining plate 1728. The retaining bolt 1726 extends through an upper retaining plate 1765 and pivotally connects to plate 1765 by way of a retaining washer 1766. Since the bolt 1726 is a captive bolt and secured to the upper external plate 1765 by way of a retaining washer 1766, the user does not have to worry about the bolt being loosened too far and lost from the screen hinge bracket 158.

The retaining bolt 1726 has an adjustment knob 1730 integrated with the head of the retaining bolt 1726 to enable the bolt to be rotated in a clockwise or counterclockwise direction. When the knob 1730 is rotated in a counterclockwise direction, the clamping plate 1720 will move toward the bottom plate 1718 of the mounting bracket 1710 to enable the top crossbar member 118 to be removed from or inserted into the bracket 1710. When the knob 1730 is rotated in the clockwise direction, the clamping plate 1720 moves toward the top plate 1712 of the mounting bracket 1710 to enable the crossbar member 118 to be clamped between the upper plate 1712 and the arms 1724 of the clamping plate 1720.

The projector support arm mounting assembly 1706 is connected to a second hinge plate 1732. The second hinge plate 1732 and the first hinge plate 1728 are interconnected via the hinge pin 1734. The hinge plate 1732 rotates with respect to the hinge plate 1728 about the hinge pin 1734 in the direction indicated generally by the arrow 1736. This enables the projector support arms mounted within the projector mounting mechanism 1706 to pivot with respect to the screen frame 100.

The projector support arm mounting assembly 1706 includes a mounting bracket 1738. The mounting bracket 1738 includes a bottom plate 1740 on which the projector support arm 138 will rest. The mounting bracket 1738 further includes a retaining ledge 1742 which is perpendicular to the bottom plate 1740. A side plate 1744 is also perpendicular to the bottom plate 1740. The width of the bottom plate 1740 is such that the projector support arm 138 will fit between the ledge 1742 and the side plate 1744. A top plate 1746 extends perpendicular from the side plate 1744 and parallel to the bottom plate 1740. The height of the side plate 1744 is such that the distance between the bottom surface of the top plate 1746 and an edge of the retaining lip 1742 enables the projector support arm 138 to be inserted or removed from within the mounting bracket 1738.

The clamping plate 1748 includes a base portion 1750 and two clamping arms 1752 extending on each side of the mounting bracket 1738. The clamping plate 1748 clamps the projector support arms 138 between the clamping arms 1752 and the bottom plate 1740. An upper retaining plate 1754 is connected to the top plate 1746 of the clamping plate 1748 and extends outwardly from the side plate 1744. The upper retaining plate 1754 has a hole defined therein for receiving a bolt 1756 that is inserted therethrough. The bolt 1756 goes down to and connects with the lower retaining plate 1758 in a pivotal manner. The lower retaining plate 1758 is mounted to the bottom surface of the bottom plate 1740 of the mounting bracket 1738. The rotatable connection of the bolt 1756 with the lower retaining plate 1758 enables the bolt to be retained with the screen hinge bracket 1706 without becoming separated therefrom.

Between the lower retaining plate 1758 and the second hinge plate 1732 is a pivot plate 1760. The pivot plate 1760 provides a pivotal connection between the lower retaining plate 1758 and the second hinge plate 1732 along with a retaining bolt 1762 inserted therethrough. The projector support arm mounting assembly 1706 must be able to pivot on the second hinge plate 1732 as the projector support arms 138 will be at an angle to the top crossbar member 118 rather than perpendicular thereto. Thus, the projector support arm assembly 1706 must be able to pivot to account for this angled connection of the projector support arms 138.

A control knob 1764, as described similarly hereinabove, is used for controlling the clamping plate 1748. When the control knob is turned in a counterclockwise direction, the clamping plate 1748 will move toward the top plate of the mounting bracket 1738 enabling the projector support arm 138 to be inserted into the mounting bracket or removed therefrom. Additionally, when the knob is turned in the clockwise direction, the clamping plate 1748 will move toward the bottom plate 1740 of the mounting bracket 1738 enabling the projector support arm 138 to be clamped between the upper surface of the bottom plate 1740 of the mounting bracket 1738 and the bottom surface of the clamping arms 1752 of the clamping plate 1748.

Figure 20:
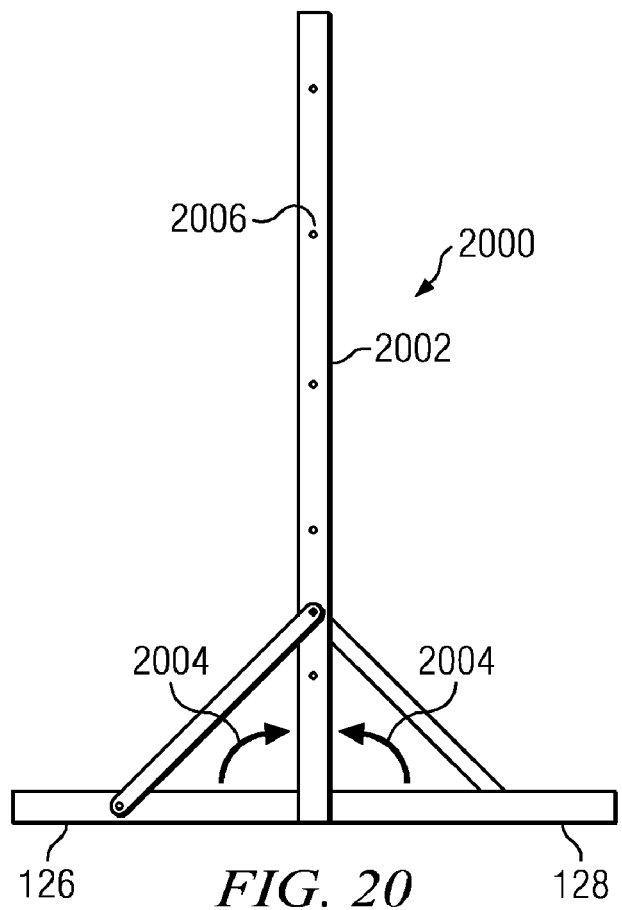
FIG. 20 illustrates a side view of the left bottom portion of the first projector mounting system height extension leg.

Referring now to FIG. 20, there is illustrated the height extenders 2000 that may be used to raise the level of the screen frame 100. A height extender 2000 is used with each of the first and second vertical members 102 and 104. As discussed previously, on each side of the height extenders 2000 are a base foot extender 126 and base foot extender 128. Each of the base foot extenders 126 and 128 may be folded upward against the side of the vertical height extension leg member 2002 as indicated generally by the direction of the arrows 2004. A series of holes 2006 are drilled within the vertical height extension leg member 2002 for receiving a threaded bolt that is inserted therethrough to threadedly engage the vertical members 102 and 104 as will be more fully described hereinbelow.

Figure 21:
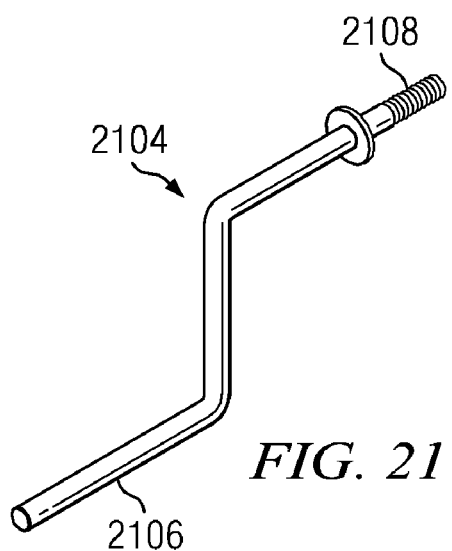
FIG. 21 illustrates the height extender locking pin.

The locking mechanism illustrated in FIG. 21 includes a bar member 2104 having a first end connected to a handle 2106 and a threaded portion 2108 at a second end. The handle 2106 contains an l-shaped crank connected to the second end of the extension bar 2104. While the implementation of FIG. 21 illustrates the use of an l-shaped crank for the handle 2106, other configurations such as a knob or other type of apparatus enabling rotation of the extension bar 2104 could be utilized. The extension bar 2104 is inserted through the holes 2006 of vertical height extension leg member 2002 and holes 161 of the vertical members 102 and 104. The threaded portion 2108 of the extension bar 2104 is engaged in the threaded inserts of the vertical members 102 and 104. The handle 2106 is rotated to screw the threaded portion 2108 into the threaded inserts. When completed, the screen will be raised to the desired level depending upon which of the insert pass through holes 2006 of the vertical height extension leg member 2002 are utilized.

Figure 22:
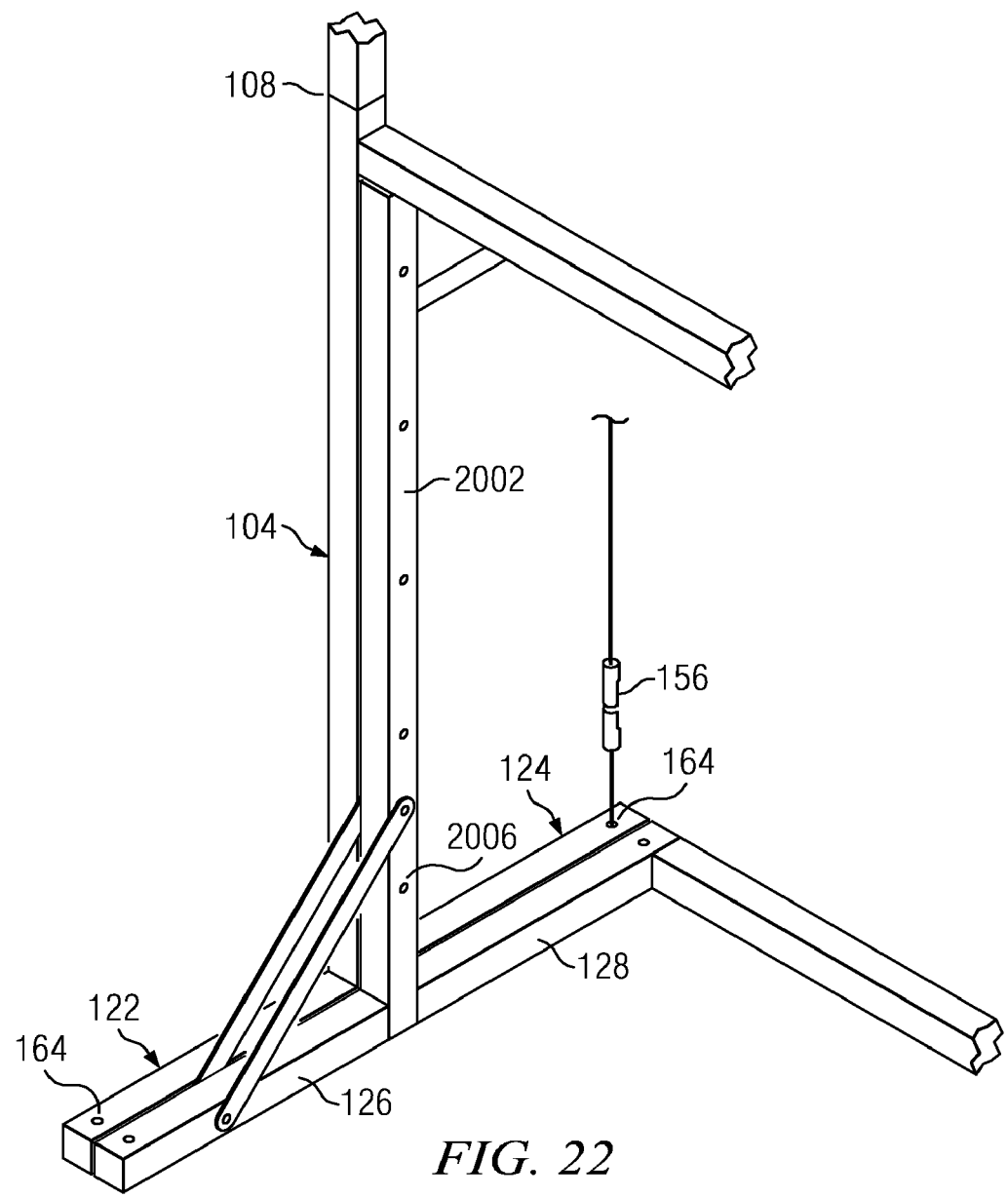
FIG. 22 is a perspective view illustrating the use of a height extender leg with the projector mounting system.

Referring now to FIG. 22, there is more fully illustrated an implementation of the use of the height extender 2000 with respect to one of the vertical members 102. In this case, the base support members 122 and 124 have been collapsed to be perpendicular to the height extender 2000. Using the configuration illustrated with respect to FIG. 22, the overall screen frame structure 100 may be raised to a desired level.

Figure 23:
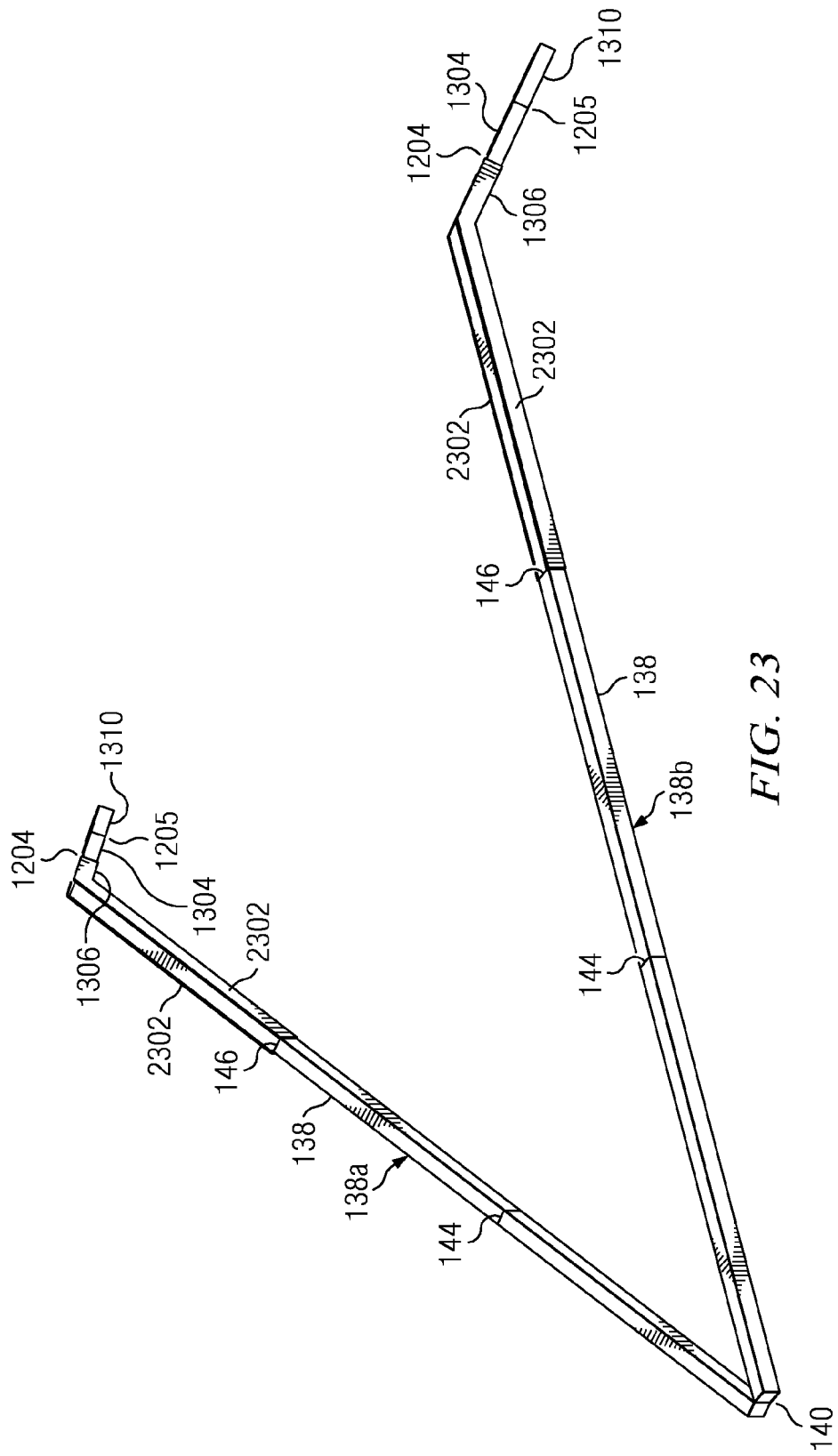
FIG. 23 provides a perspective view of the projector support arm including an associated support plate.

Referring now to FIG. 23, there is more fully illustrated the interconnection of the projector support arms 138 with the mounting portion 148. When the projector screen hinge bracket 158 is connected to the projector support arms 138 to mount them to the top crossbar member 118, a great deal of stress is placed between the projector support arms 138 and the mounting portions 148 due to the weight of the projector on the end of the projector support arms 138 and the cable 150 connecting the mounting portions 148 to the base members 124. In some instances, this stress placed upon the projector support arms 138 and the mounting portions 148 can cause the mounting portion 148 or the support arms 138 to snap and break.

In order to minimize this possibility, support plates 2302 are placed along each lateral side of the support arms 138 and mounting portion 148. The support plates 2302 extend from the pivot points 1204 to the pivot points 146. The reason for this is that it is desired that the projector support arms 138 and the mounting portion 148 still be able to be folded at all hinge points 1204 and 146 without the support plate 2302 interfering with this process. In this manner, the support plates 2302 on each side of the support arms 138 provides additional support and strength to the support arms 138 and the mounting portion 148 to limit the possibilities of the support arm breaking due to weight of the projector on the support arm.

Figure 24:
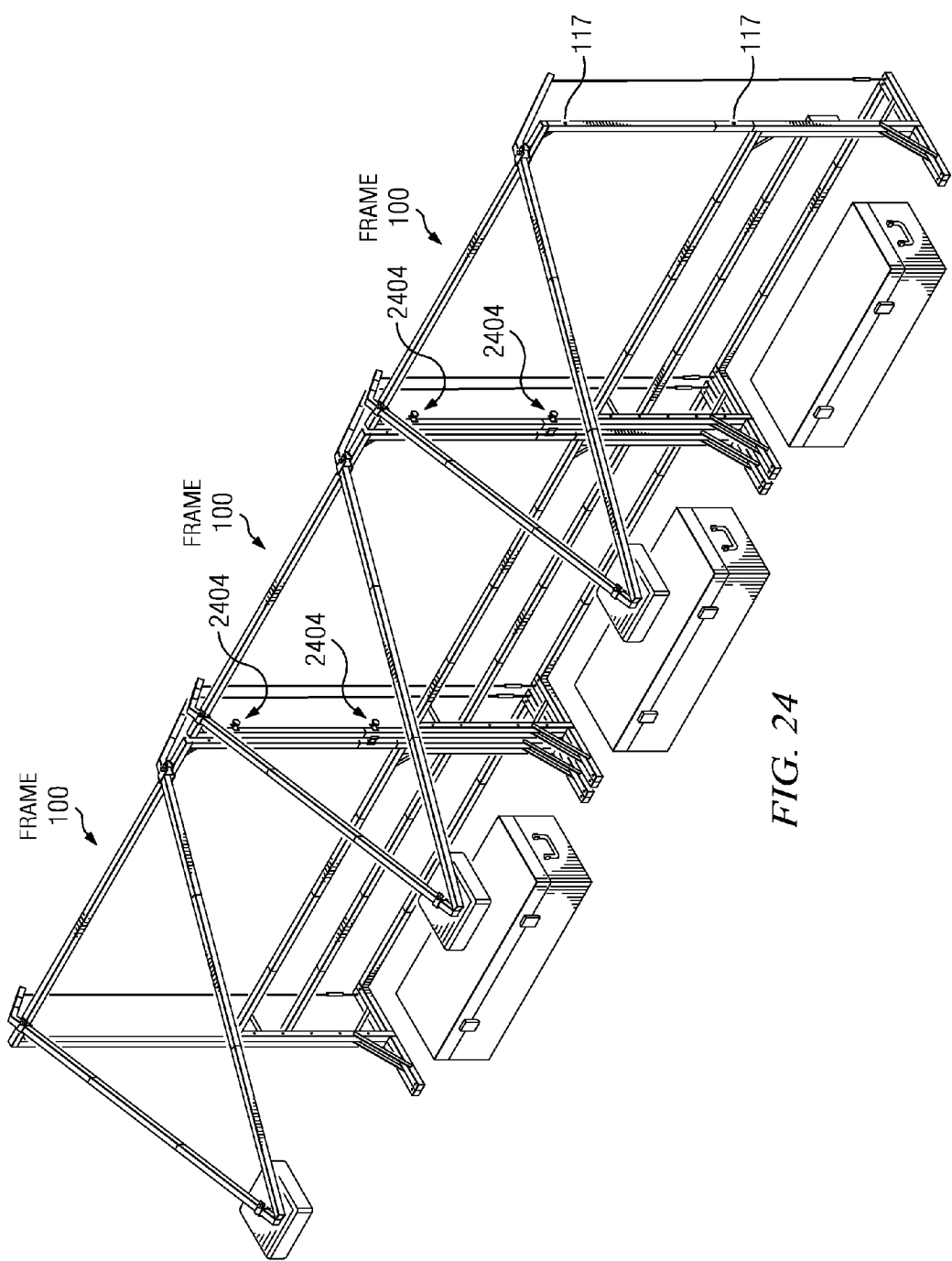
FIG. 24 illustrates a perspective view of multiple screens supporting a single display surface.

Referring now to FIG. 24, there is illustrated a configuration for interconnecting multiple screen mounting frames 100. Each of the screen frames 100 are connected together via a series of screen separator mounting brackets 2404. The mounting brackets 2404 are affixed to adjacent vertical members 102 and 104. This enables the screen frames 100 to be fixedly connected in close proximity to each other and provide a large display area combining the smaller areas of each screen frame 100. The outer edges of the screen frames 100 include a number of snap connectors enabling a screen to be snapped along the top, bottom and side edges defined by the multiple screen frames 100. In this manner, multiple screen mounting frames 100 may be used to provide one single continuous display screen. By using the mounting brackets 2404 to hold the screen in a fixed position, the screen is maintained as a single continuous surface. When projectors associated with each of the three screen frames 100 are mounted on top crossbar members 118, the system is able to project three separate images across the screen, or alternatively, can be configured to provide a single continuous panoramic image across the screen. The outside projector support arms 138 must be moved inward on top crossbar members 118 toward the center screen frame 100 to provide a single continuous panoramic image across the screen. While the use of three screen structures is illustrated, fewer or more screen frames 100 may be used as necessary; however, the projector support arms 138 must be moved on top crossbar members 118 to provide a single continuous panoramic image across the screen.

Figure 25:
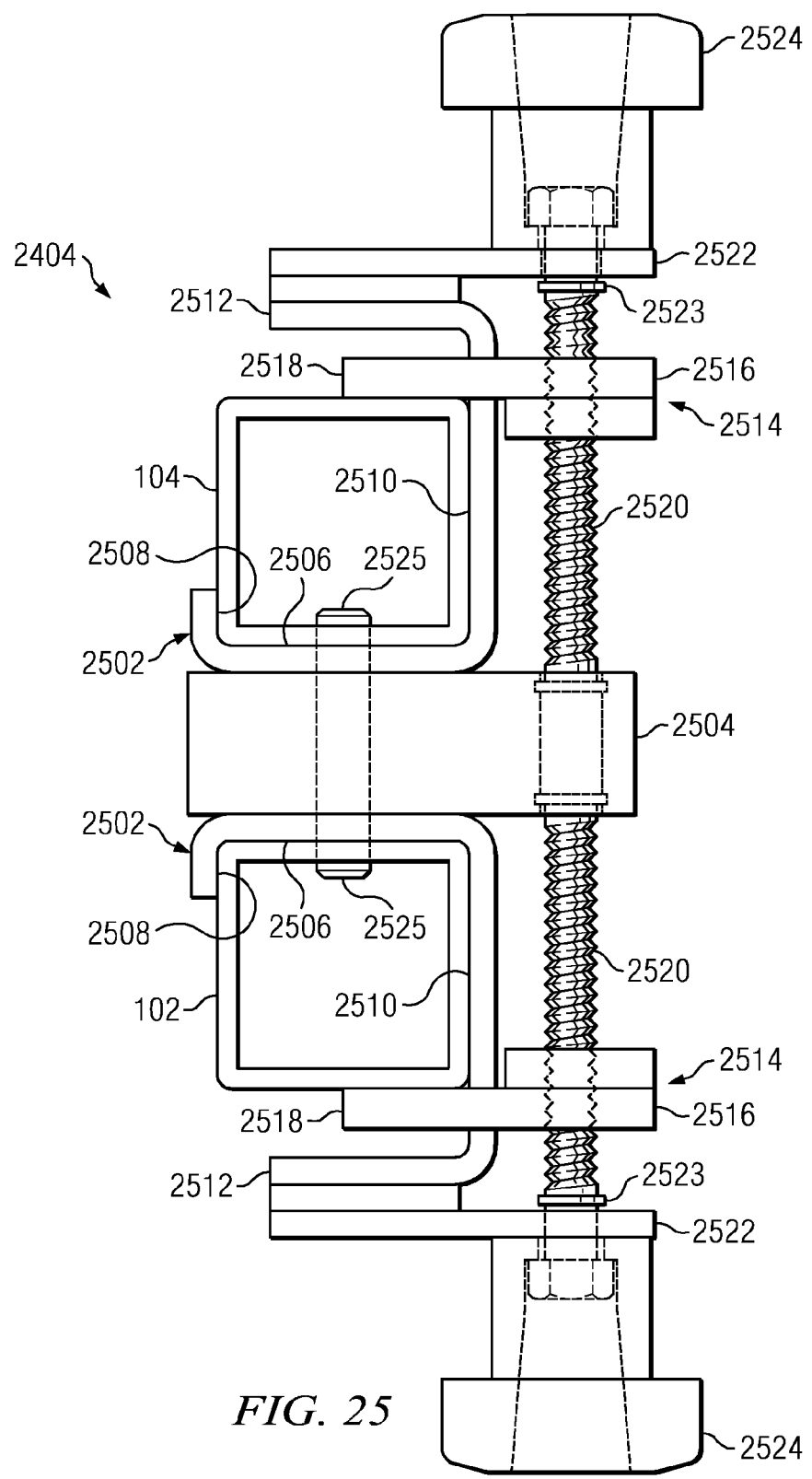
FIG. 25 illustrates a top view of a bracket for connecting adjacent projector mounting screens.
Figure 26:
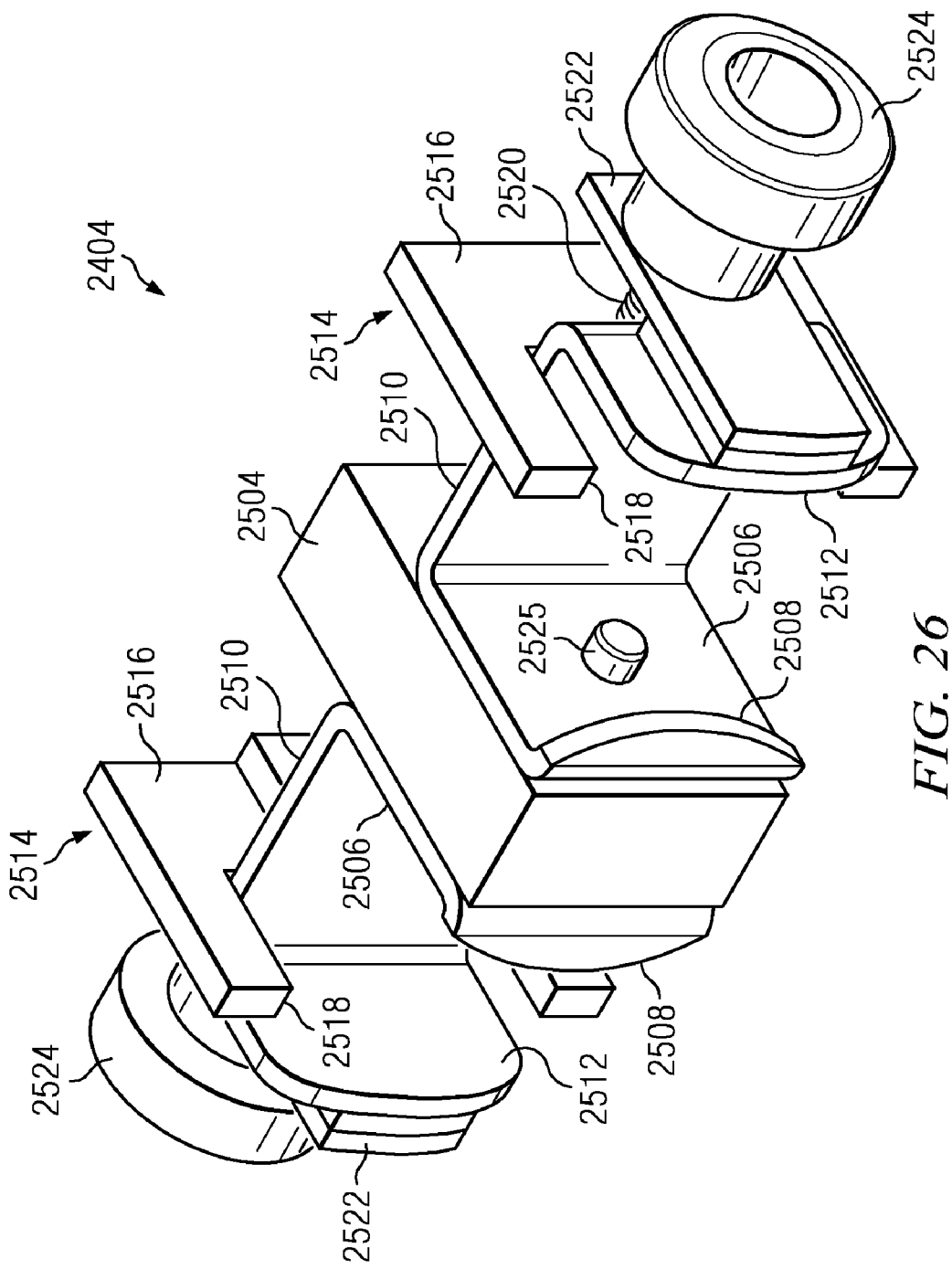
FIG. 26 illustrates a perspective view of the bracket for connecting projector mounting screens together.

Referring now to FIGS. 25-26, there is illustrated the screen separator mounting bracket 2404. The screen separator mounting bracket 2404 includes a pair of mounting brackets 2502 that are separated by a divider spacer 2504. The mounting brackets 2502 include a bottom plate 2506 separating a retaining ledge 2508 and a side plate 2510. The retaining ledge 2508 and side plate 2510 are perpendicular to the bottom plate 2506. The bottom plate 2506 separates the retaining ledge 2508 and side plate 2510 by a distance enabling the vertical support member 102 and 104 to fit between the retaining ledge 2508 and side plate 2510. Each of the bottom plates 2506 are fixedly connected to the separating spacer 2504. A top plate 2512 extends perpendicularly from the side plate 2510 opposite the bottom plate 2506. The side plate 2510 separates the bottom plate 2506 from the top plate 2512 by a distance such that the lateral support members 102 and 104 may be inserted into the mounting bracket 2404 through an opening between the edge of the retaining ledge 2508 and the surface of the top plate 2512.

The vertical support members 102 and 104 are clamped into the mounting bracket 2404 via a clamping plate 2514. The clamping plate 2514 consists of a base portion 2516 and a pair of clamping arms 2518 that extend on each side of the mounting bracket 2502. The clamping plate 2514 is tightened and loosened via a bolt 2520 which extends through a hole in an upper mounting plate 2522. The bolt then extends through a threaded hole within the mounting plate 2514 and is pivotally connected to the divider spacer 2504. By pivotally connecting the bolt 2520 to the divider spacer 2504, the bolt 2520 is captive within the screen separator bracket 2404. The retaining washer 2523 enables the bolt 2520 to be retained with the screen separator mounting bracket 2404 preventing the bolt 2520 from becoming separated and lost from the bracket.

A tightening knob 2524 may be turned in first and second directions to control the position of the clamping plate 2514. When the tightening knob 2524 is turned in a counterclockwise direction, the clamping plate 2516 will move toward the plates 2512 of the mounting bracket 2502 enabling the projector support member 102 and 104 to either be removed from or inserted into the mounting bracket 2502. When the tightening screw 2524 is turned in the clockwise direction, the clamping plate 2514 moves closer to the plates 2506 of the mounting bracket 2502. In this case, the projector support member 102 and 104 may be securely clamped between the top plate 2502 and the clamping arms 2518. The registering pins 2525 of the mounting bracket 2404 align the screen frames 100 using pin holes 117 in the outside edges of first vertical support member 102 and second vertical support member 104. The pin registering of the screen frames 100 is required to provide an aligned single continuous panoramic image across multiple screen frames 100. Also, the registering pins 2525 allow an attachment point so the screens may be lifted off the ground and raised for proper viewing.

It will be appreciated by those skilled in the art having the benefit of this disclosure that this portable and transportable 2-D and 3-D display system provides a system that may be easily broken down for transport in field use conditions. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A portable projection system, comprising:
a first vertical member including at least one hinged point for folding the first vertical member into at least two separate portions;
a second vertical member including at least one hinged point for folding the second vertical member into at least two separate portions, the second vertical member disposed parallel to the first vertical member and having substantially the same length as the first vertical member;
a first horizontal member disposed perpendicular to and pivotally connected with the first and second vertical members including at least one hinged point for folding the upper horizontal member into at least two separate portions;
a second horizontal member disposed perpendicularly between and pivotally connected with the first and second vertical member including at least one hinged point for folding the second horizontal member into at least two separate portions and located below the first horizontal member to define a viewing area bounded by the first and second vertical members and the first and second horizontal members;
a viewing screen disposed over said viewing area;
at least one base member pivotally connected to a base end of each of the first and second vertical members, the at least one base member pivoting between a first position parallel to the first or second vertical member and a second position perpendicular to the first or second vertical member;
a projector mounting assembly comprising a first and second mounting members, the first and second mounting members pivotally connected to each other at first ends of the first and second mounting members, the first and second mounting members including at least one hinged point for folding the first and second mounting members into at least two separate portions, the first and second mounting members extending over the first horizontal member such that the first ends of the first and second mounting members are disposed forward of the viewing area a first distance and a second end of the first and second mounting members extending rearward of the viewing area a second distance;
a projector mounting assembly mounting bracket associated with each of the first and second mounting members for pivotally connecting the first and second mounting members with the first horizontal member; and a plurality of cables, each cable connecting the second end of one of the first and second mounting members with a base member to maintain the first and second mounting members substantially perpendicular to the viewing area.

2. The portable projection system of claim 1, wherein the projector mounting assembly mounting bracket further comprises:
a hinge, comprising:
a first hinge plate;
a second hinge plate;
a hinge pin for pivotally connecting the first hinge plate with the second hinge plate;
a horizontal member mounting bracket for clamping the projector mounting assembly mounting bracket to the first horizontal member fixedly connected to the second hinge plate;
a first clamping bolt that is rotatably connected to the horizontal member mounting bracket such that the first clamp bolt cannot become separated from the horizontal member mounting bracket;
wherein rotation of the first clamping bolt in a first direction clamps the first horizontal member into the horizontal member mounting bracket and rotation of the clamping bolt in a second direction loosens the horizontal member mounting bracket from the first horizontal member;
a mounting member bracket for clamping a mounting member to the first horizontal member pivotally connected to the first hinge plate, wherein the pivotal connection enables the mounting member to clamp flush within the mounting member bracket;
a second clamping bolt that is rotatably connected to the mounting member bracket such that the second clamp bolt cannot become separated from the mounting member bracket;
wherein rotation of the second clamping bolt in a first direction clamps the mounting member into the mounting member bracket and rotation of the clamping bolt in a second direction loosens the mounting member bracket from the mounting member.

3. The portable projection system of claim 2, wherein the horizontal member mounting bracket further comprises:
a C-shaped clamp for receiving the horizontal mounting member; and
a clamping plate for clamping the horizontal member between the clamping plate and a side of the C-shaped clamp;
wherein the first clamping bolt threadedly engages the clamping plate.

4. The portable projection system of claim 2, wherein the mounting member bracket further comprises:
a second C-shaped clamp for receiving the horizontal mounting member; and
a second clamping plate for clamping the horizontal member between the second clamping plate and a side of the second C-shaped clamp;
wherein the second clamping bolt threadedly engages the second clamping plate.

5. The portable projection system of claim 1, further including a projector mounting bracket for mounting a projector to the first mounting member, the projector mounting bracket further comprising:
a mounting plate;
a plurality of fasteners within the mounting plate, the plurality of fasteners threadedly engaging a projector and securing it to the mounting plate;
a projector clamp for clamping the projector mounting bracket to the first mounting member, the projector clamp pivotally connected to the mounting plate to enable a position of a projector to be adjusted.

6. The portable projection system of claim 5, wherein the projector clamp further comprises:
a C-shaped clamp for receiving the first mounting member; and
a clamping plate for clamping the first mounting member between the clamping plate and a side of the C-shaped clamp;
a clamping bolt that is rotatably connected to the C-shaped clamp such that the clamping bolt cannot become separated from the projector clamp.

7. The portable projection system of claim 1, further including:
a plurality of threaded inserts located on the first and second vertical members;
a riser member defining a plurality of pass-through holes therethrough running vertically up the riser member, wherein the riser member enables the first and the second vertical member to be raised to a higher level;
a base support supporting the riser member; and
a plurality of locking pins that pass through a plurality of the pass-throughs of the riser member and threadedly engages a threaded insert within the first or the second vertical member, wherein a selected threaded insert defines a raised height for the first and the second vertical members.

8. The portable projection system of claim 1, further including at least one support plate located on a lateral side of the first mounting member and the second mounting member for providing additional strength to the first and the second mounting members, the at least one support plate located substantially near a mounting point of the projector mounting assembly mounting bracket, the at least one support plate further positioned not to interfere with the at least one hinged point of the first and second mounting members.

9. The portable projection system of claim 1 further including:
a second portable projection system defining a second viewing area within a third and fourth vertical members and a third and fourth horizontal members; and
at least one bracket for interconnecting the first vertical member of the portable projection system with the fourth vertical member of the second portable projection system to define a larger viewing area comprised of the viewing area and the second viewing area, the at least one bracket further comprising:
a separator block for separating the first vertical member from the fourth vertical member at a fixed distance;
a first C-shaped clamp for receiving the first vertical member connected to a first side of the separator block;
a first clamping plate for clamping the first vertical member between the first clamping plate and a side of the first C-shaped clamp;
a first clamping bolt that is rotatably connected to the separator such that the clamping bolt cannot become separated from the at least one bracket, wherein rotation of the first clamping bolt in a first direction clamps the first vertical member into the at least one bracket and rotation of the first clamping bolt in a second direction loosens the at least one bracket from the first vertical member;

a second C-shaped clamp for receiving the fourth vertical member connected to a second side of the separator block; and a second clamping plate for clamping the fourth vertical member between the second clamping plate and a side of the second C-shaped clamp;

a second clamping bolt that is rotatably connected to the separator such that the second clamping bolt cannot become separated from the at least one bracket, wherein rotation of the second clamping bolt in the first direction clamps the fourth vertical member into the at least one bracket and rotation of the second clamping bolt in the second direction loosens the at least one bracket from the fourth vertical member.

10. The portable projection system of claim 8, wherein the at least one bracket for interconnecting further includes registration pins for engaging a corresponding hole on the first and the second vertical members for at least one of aligning with an adjacent screen or raising an overall height of adjacent screens.

11. A portable projection system, comprising:

a first vertical member including at least one hinged point for folding the first vertical member into at least two separate portions;

a second vertical member including at least one hinged point for folding the second vertical member into at least two separate portions, the second vertical member disposed parallel to the first vertical member and having substantially the same length as the first vertical member;

a first horizontal member disposed perpendicular to and pivotally connected with the first and second vertical members including at least one hinged point for folding the upper horizontal member into at least two separate portions;

a second horizontal member disposed perpendicularly between and pivotally connected with the first and second vertical member including at least one hinged point for folding the second horizontal member into at least two separate portions and located below the first horizontal member to define a viewing area bounded by the first and second vertical members and the first and second horizontal members;

a viewing screen disposed over said viewing area;

at least one base member pivotally connected to a base end of each of the first and second vertical members, the at least one base member pivoting between a first position parallel to the first or second vertical member and a second position perpendicular to the first or second vertical member;

a projector mounting assembly comprising a first and second mounting members, the first and second mounting members pivotally connected to each other at first ends of the first and second mounting members, the first and second mounting members including at least one hinged point for folding the first and second mounting members into at least two separate portions, the first and second mounting members extending over the first horizontal member such that the first ends of the first and second mounting members are disposed forward of the viewing area a first distance and a second end of the first and second mounting members extending rearward of the viewing area a second distance;

a projector mounting assembly mounting bracket associated with each of the first and second mounting members for pivotally connecting the first and second mounting members with the first horizontal member;

at least one support plate located on a lateral side of the first mounting member and the second mounting member for providing additional strength to the first and the second mounting members, the at least one support plate located substantially near a mounting point of the projector mounting assembly mounting bracket, the at least one support plate further positioned not to interfere with the at least one hinged point of the first and second mounting members;

a plurality of cables, each cable connecting the second end of one of the first and second mounting members with a base member to maintain the first and second mounting members substantially perpendicular to the viewing area;

a riser member defining a plurality of pass-through holes therethrough running vertically up the riser member, wherein the riser member enables the first and the second vertical member to be raised to a higher level;

a base support supporting the riser member; and a plurality of locking pins that pass through a plurality of the pass-through of the riser member and engages the first or the second vertical member.

12. The portable projection system of claim 11, wherein the projector mounting assembly mounting bracket further comprises:

a hinge, comprising:

a first hinge plate;

a second hinge plate;

a hinge pin for pivotally connecting the first hinge plate with the second hinge plate;

a horizontal member mounting bracket for clamping the projector mounting assembly mounting bracket to the first horizontal member fixedly connected to the second hinge plate;

a first clamping bolt that is rotatably connected to the horizontal member mounting bracket such that the first clamp bolt cannot become separated from the horizontal member mounting bracket;

wherein rotation of the first clamping bolt in a first direction clamps the first horizontal member into the horizontal member mounting bracket and rotation of the clamping bolt in a second direction loosens the horizontal member mounting bracket from the first horizontal member;

a mounting member bracket for clamping a mounting member to the first horizontal member pivotally connected to the first hinge plate, wherein the pivotal connection enables the mounting member to clamp flush within the mounting member bracket;

a second clamping bolt that is rotatably connected to the mounting member bracket such that the second clamp bolt cannot become separated from the mounting member bracket;

wherein rotation of the second clamping bolt in a first direction clamps the mounting member into the mounting member bracket and rotation of the clamping bolt in a second direction loosens the mounting member bracket from the mounting member.

13. The portable projection system of claim 12, wherein the horizontal member mounting bracket further comprises:

a C-shaped clamp for receiving the horizontal mounting member; and a clamping plate for clamping the horizontal member between the clamping plate and a side of the C-shaped clamp;

wherein the first clamping bolt threadedly engages the clamping plate.

14. The portable projection system of claim 12, wherein the mounting member bracket further comprises:
   a second C-shaped clamp for receiving the horizontal mounting member; and
   a second clamping plate for clamping the horizontal member between the second clamping plate and a side of the second C-shaped clamp;
   wherein the second clamping bolt threadedly engages the second clamping plate.

15. The portable projection system of claim 11, further including a projector mounting bracket for mounting a projector to the first mounting member, the projector mounting bracket further comprising:
   a mounting plate;
   a plurality of fasteners within the mounting plate, the plurality of fasteners threadedly engaging a projector and securing it to the mounting plate;
   a projector clamp for clamping the projector mounting bracket to the first mounting member, the projector clamp pivotally connected to the mounting plate to enable a position of a projector to be adjusted.

16. The portable projection system of claim 15, wherein the projector clamp further comprises:
   a C-shaped clamp for receiving the first mounting member; and
   a clamping plate for clamping the first mounting member between the clamping plate and a side of the C-shaped clamp;
   a clamping bolt that is rotatably connected to the C-shaped clamp such that the clamping bolt cannot become separated from the projector clamp.

17. The portable projection system of claim 11 further including:
   a second portable projection system defining a second viewing area within a third and fourth vertical members and a third and fourth horizontal members; and
   at least one bracket for interconnecting the first vertical member of the portable projection system with the fourth vertical member of the second portable projection system to define a larger viewing area comprised of the viewing area and the second viewing area, the at least one bracket further comprising:
   a separator block for separating the first vertical member from the fourth vertical member at a fixed distance;
   a first C-shaped clamp for receiving the first vertical member connected to a first side of the separator block;
   a first clamping plate for clamping the first vertical member between the first clamping plate and a side of the first C-shaped clamp;
   a first clamping bolt that is rotatably connected to the separator such that the clamping bolt cannot become separated from the at least one bracket, wherein rotation of the first clamping bolt in a first direction clamps the first vertical member into the at least one bracket and rotation of the first clamping bolt in a second direction loosens the at least one bracket from the first vertical member;
   a second C-shaped clamp for receiving the fourth vertical member connected to a second side of the separator block; and
   a second clamping plate for clamping the fourth vertical member between the second clamping plate and a side of the second C-shaped clamp;
   a second clamping bolt that is rotatably connected to the separator such that the second clamping bolt cannot become separated from the at least one bracket, wherein rotation of the second clamping bolt in the first direction clamps the fourth vertical member into the at least one bracket and rotation of the second clamping bolt in the second direction loosens the at least one bracket from the fourth vertical member.

18. The portable projection system of claim 17, wherein the at least one bracket for interconnecting further includes registration pins for engaging a corresponding hole on the first and the second vertical members for at least one of aligning with an adjacent screen or raising an overall height of adjacent screens.

\* \* \* \* \*